United States Patent [19]

Veldhuis et al.

[11] Patent Number: 5,365,553

[45] Date of Patent: Nov. 15, 1994

[54] TRANSMITTER, ENCODING SYSTEM AND METHOD EMPLOYING USE OF A BIT NEED DETERMINER FOR SUBBAND CODING A DIGITAL SIGNAL

[75] Inventors: Raymond N. J. Veldhuis; Robbert G. van der Waal; Leon M. van de Kerkhof; Gerrit J. Keesman, all of Eindhoven, Netherlands

[73] Assignee: U.S. Philips Corporation, New York, N.Y.

[21] Appl. No.: 144,093

[22] Filed: Oct. 27, 1993

Related U.S. Application Data

[63] Continuation of Ser. No. 694,324, May 1, 1991, abandoned, which is a continuation of Ser. No. 621,693, Nov. 30, 1990, abandoned.

[51] Int. Cl.$^5$ .............................................. H04B 1/66
[52] U.S. Cl. ..................................... 375/122; 381/29; 381/37; 381/35; 341/200
[58] Field of Search ................... 375/122, 25; 370/118, 370/105.1, 82; 381/29–32, 37, 36, 35; 360/39; 341/200

[56] References Cited

U.S. PATENT DOCUMENTS

| | | | |
|---|---|---|---|
| 4,048,443 | 9/1977 | Crochiere et al. | 381/37 |
| 4,455,649 | 6/1984 | Esteban et al. | 381/29 X |
| 4,535,472 | 8/1985 | Tomcik | 381/31 X |
| 4,811,398 | 3/1989 | Copperi et al. | 381/36 X |
| 4,896,362 | 1/1990 | Veldhuis et al. | 381/30 |
| 4,912,763 | 3/1990 | Galand et al. | 381/31 |
| 4,942,607 | 7/1990 | Schröder et al. | 381/31 |
| 4,972,484 | 11/1990 | Theile et al. | 381/37 |
| 5,105,463 | 4/1992 | Veldhuis et al. | 381/37 X |
| 5,109,417 | 4/1992 | Fielder et al. | 381/36 |
| 5,115,240 | 5/1992 | Fugiwara et al. | 381/37 |
| 5,142,656 | 8/1992 | Fielder et al. | 381/37 |
| 5,214,678 | 5/1993 | Rault et al. | 375/122 |
| 5,230,038 | 7/1993 | Fielder et al. | 381/35 |

FOREIGN PATENT DOCUMENTS 3440613 10/1986 Germany.

OTHER PUBLICATIONS

EBU Techn. Review, No. 230, Aug. 1988, G. Theile et al, "Low Bit Rate Coding of High-Quality Audio Signals. An Introduction to the Mascam System".
Philips Journal of Research 44, 329–343, 1989, R. N. J. Veldhuis et al. "Subband Coding of Digital Audio Signals".
IEEE ICASSP 80, vol. 1, pp. 327–331, Apr. 9–11, 1980, M. A. Krasner "The Critical Band Coder . . . Digital Encoding of Speech Signals Based on the Perceptual Requirements of the Auditory System".
F. A. Mac Williams et al, "The Theory of Error Correcting Codes", North Holland Publishing Comp. 1983.
"Digital Communication", Bernard Sklar, P. Hall pp. 72–73, 1988.
Concise Explanation of the Relevance of German Patent No. 34 40 613 C1.

Primary Examiner—Tesfaldet Bocure
Attorney, Agent, or Firm—Richard A. Weiss

[57] ABSTRACT

Transmitter, encoding system and method for subband coding a digital signal. The encoding system includes a splitter for dividing the digital signal into subband signals $SB_1, \ldots, SB_M$; a quantizer unit for quantizing time-equivalent q sample signal blocks of the subband signals; a bit need determiner and a bit allocator. The bit need determiner determines a bit need $b_m$ which corresponds to the number of bits by which the q samples in a time-equivalent signal block in a subband signal $SB_m$ should be represented, where $1 \leq m \leq M$. The bit allocator allocates $n_m$ bits to each of the q samples of the time-equivalent signal block of subband signal $SB_m$ on the basis of the bit need $b_m$ and an available bit quantity B, $n_m$ being the number of bits by which the q samples in the time-equivalent signal block of subband signal $SB_m$ will actually be represented, where $1 \leq m \leq M$.

51 Claims, 9 Drawing Sheets

```
┌─────────────────┬─────────────────┬─────┬─────────────────┬─────┐
│ ₄₄              │                 │     │                 │     │
│ $n_k = A_{k0}$  │ $n_l = A_{l0}$  │     │                 │     │
│ $b_k=b_k-A_{k1}$│ $b_l=b_l-A_{l1}$│ ─── │ $b_f=$ FLAGVALUE│ ─── │
│ $B=B-A_{k0}q-x$ │ $B=B-A_{l0}q-x$ │     │                 │     │
└─────────────────┴─────────────────┴─────┴─────────────────┴─────┘
```

FIG.6

| $k_1-k_2$ | $T(\cdots)$ | $k_1-k_2$ | $T(\cdots)$ | $k_1-k_2$ | $T(\cdots)$ | $k_1-k_2$ | $T(\cdots)$ | $k_1-k_2$ | $T(\cdots)$ | $k_1-k_2$ | $T(\cdots)$ |
|---|---|---|---|---|---|---|---|---|---|---|---|
| 0 | 16 | 15 | 10 | 30 | 6 | 45 | 3 | 60 | 2 | 75 | 1 |
| 1 | 16 | 16 | 9 | 31 | 5 | 46 | 3 | 61 | 2 | 76 | 1 |
| 2 | 15 | 17 | 9 | 32 | 5 | 47 | 3 | 62 | 2 | 77 | 1 |
| 3 | 15 | 18 | 9 | 33 | 5 | 48 | 3 | 63 | 1 | 78 | 1 |
| 4 | 14 | 19 | 8 | 34 | 5 | 49 | 3 | 64 | 1 | 79 | 1 |
| 5 | 14 | 20 | 8 | 35 | 5 | 50 | 3 | 65 | 1 | 80 | 1 |
| 6 | 13 | 21 | 8 | 36 | 4 | 51 | 2 | 66 | 1 | 81 | 1 |
| 7 | 13 | 22 | 8 | 37 | 4 | 52 | 2 | 67 | 1 | 82 | 1 |
| 8 | 12 | 23 | 7 | 38 | 4 | 53 | 2 | 68 | 1 | 83 | 1 |
| 9 | 12 | 24 | 7 | 39 | 4 | 54 | 2 | 69 | 1 | 84 | 1 |
| 10 | 12 | 25 | 7 | 40 | 4 | 55 | 2 | 70 | 1 | 85 | 1 |
| 11 | 11 | 26 | 6 | 41 | 4 | 56 | 2 | 71 | 1 | 86 | 1 |
| 12 | 11 | 27 | 6 | 42 | 3 | 57 | 2 | 72 | 1 | 87 | 1 |
| 13 | 10 | 28 | 6 | 43 | 3 | 58 | 2 | 73 | 1 | 88 | 1 |
| 14 | 10 | 29 | 6 | 44 | 3 | 59 | 2 | 74 | 1 | 89 | 0 |

FIG.7

TRANSMITTER, ENCODING SYSTEM AND METHOD EMPLOYING USE OF A BIT NEED DETERMINER FOR SUBBAND CODING A DIGITAL SIGNAL This is a continuation of application Ser. No. 07/694,324, filed May 1, 1991 and now abandoned, which is a continuation of application Ser. No. 07/621,693, filed Nov. 30, 1990 and now abandoned.

BACKGROUND OF THE INVENTION

The present invention relates to an encoding system for subband coding of a wideband digital signal, for example, a digital signal having a specific sampling frequency $F_s$. The encoding system comprises: (a) a splitter which divides the bandwidth of the wideband digital signal into M successive subbands which augment with frequency, and generates, in response to the wideband digital signal, M subband signals with sampling frequency reduction, each of the subband signals being associated with one of the subbands; (b) a quantizer unit for quantizing block-by-block the respective subband signals, a subband signal $SB_m$ of the subband signals being composed of successive signal blocks, each signal block comprising q samples, the q samples in a quantized signal block of subband signal $SB_m$ each being represented by $n_m$ bits; (c) a bit need determiner for determining bit needs for corresponding (i.e., time-equivalent) signal blocks of the subband signals, a signal block of subband signal $SB_m$ having a bit need $b_m$ which is related to the number of bits by which the q samples in that signal block should be represented; and (d) a bit allocator for allocating bits from an available quantity of bits B to the samples in the time-equivalent signal blocks of the subband signals in response to the bit needs determined by the bit need determiner, such allocation establishing the value of $n_m$; where $1 \leq m \leq M$. The encoding system may further comprise a formatting circuit for assembling the quantized samples of the time-equivalent signal blocks to form an output signal having successive frames and including scale factor information in each frame, which scale factor information comprises x-bit words, an x-bit word representing a scale factor associated with the samples in a signal block. An encoding system of the aforementioned type is known from U.S. Pat. No. 4,896,362.

SUMMARY OF THE INVENTION

The invention specifically relates to a bit need determiner for, determining the bit needs $b_1$ to $b_M$ for corresponding (i.e., time-equivalent) signal blocks in the subbands 1 to M on the basis of the output signals (i.e., the subband signals $SB_L$ to $SB_M$) of the splitter.

The invention therefore has for an object to derive the bit needs by implementing a novel method.

For this purpose, the encoding system according to the invention is characterized in that the bit need determiner is arranged:

for estimating the power $v_m$ in a signal block of subband signal $SB_m$ in a subband m for corresponding signal blocks of the subband signals in the subbands;

for determining the sample $SF_m$ having the maximum absolute value in the signal block;

for calculating the magnitude $w_m$ according to the formula $$w_m = \sum_{i=1}^{M} d_{mi} v_i + w_{r,m}; \text{ and}$$

for calculating $b_m$ according to the formula $$b_m = K_1 \cdot {}^2\log(K_2 \sqrt{SF_m^2/w_m} + K_3);$$

wherein $d_{mi}$ is a matrix coefficient in an $M \times M$ matrix [D], this matrix coefficient denoting the coefficient by which the power $v_i$ in the subband i is multiplied to calculate the value of the masked power in the subband m as a result of the signal in the block in the subband i; $w_{r,m}$ is a measure for the masking threshold in the subband m; and $K_1$, $K_2$ and $K_3$ are constants.

It should be observed in this context that the bit needs for the corresponding signal blocks in the various subbands has already been determined in the prior art. However, different algorithms have been used and different assumptions have been made prior hereto.

For example, in the article entitled "Low bit rate coding of high quality audio signal. An introduction to the MASCAM system", by G. Theile et al., published in the EBU Technical Review, No. 230, in August, 1988, a signal-to-noise ratio is determined per subband. This signal-to-noise ratio, expressed in dB, and divided by 6, then yields the bit need in a subband.

The coefficients $K_1$ and $K_2$ are preferably selected to be equal to 1 or $1\sqrt{3}$. $K_3$ has a wider range of possibilities, as this constant has less influence on the eventual result of the encoding. For example, one may take the value of 1 for $K_3$, or omit $K_3$ altogether.

For the calculation of the bit needs, a logarithmic representation for the various magnitudes is preferably used. This is advantageous in that a relatively small word length (number of bits by which the various magnitudes are represented) will be sufficient for the various magnitudes, whereas still a sufficient relative accuracy for the bit needs can be realized. This implies that the electronics for the realization of the bit need determiner may be of simpler structure.

BRIEF DESCRIPTION OF THE DRAWINGS

The invention will be further explained in the following descriptions with reference to a number of exemplary embodiments, in which:

FIG. 6 shows the initial bit allocation;

FIG. 7 shows the correction Table to be used for number additions utilizing a logarithmic representation of the numbers;

DETAILED DESCRIPTION OF THE PREFERRED EMBODIMENTS

Figure 1:
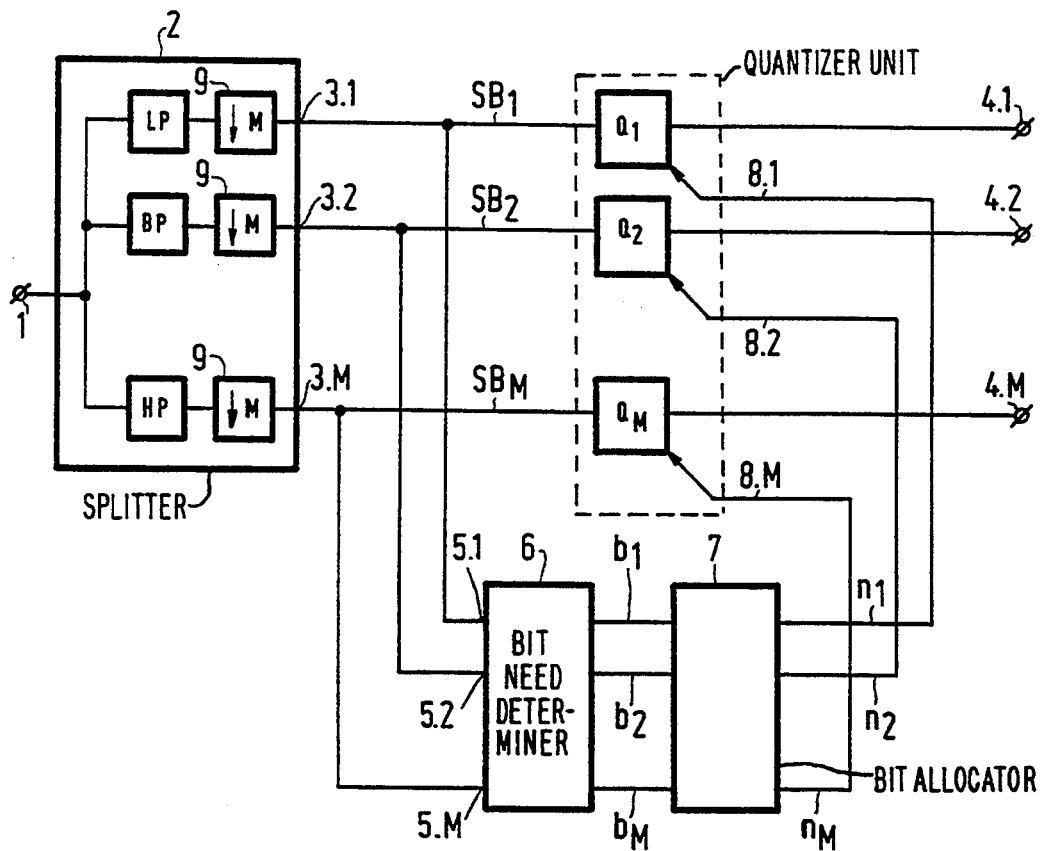
FIG. 1 shows an encoding system according to the invention.

The description of the system in the drawings will relate to the description of the subband encoding of a single digital signal. That is to say, subband encoding of a mono audio signal, or of only the right or left signal portion of a stereo audio signal. This means that in each subband there is only one subband signal present. At the end of this description is an explanation of how the bit need may be determined in case of subband encoding of a stereo signal, it being understood that there are two subband signals in each subband in that situation.

FIG. 1 shows an encoding system according to the invention. A wideband digital signal is applied to input terminal 1, such as a digitally sampled audio signal having a bandwidth of approximately 20 kHz. Input 1 is supplied with the samples of the digital audio signal having, for example, a sampling frequency of 44 kHz, each sample being, for example, 16 bits. The signal is applied to a splitter 2 which comprises M signal splitter filters. The splitter 2 distributes the digital signal over M subbands by means of the M filters, that is to say, a low-pass filter LP, M-2 band-pass filters BP and a high-pass filter HP, for example. M is, for example, equal to 32. The sampling frequency of the M subband signals is reduced in the blocks referenced 9. In those blocks, the sampling frequency is reduced by a factor M. The signals, thus, obtained are available at the outputs 3.1, 3.2, ..., 3.M. At the output 3.1, a signal $SB_1$ is available in the lowest subband 1. An the output 3.2, a signal $SB_2$ is available in the lowest but one subband 2. At the output 3.M, a signal $SB_M$ is available in the highest subband M. The subband signals $SB_1$ to $SB_M$ at the outputs 3.1 to 3.M each include successive samples, each sample being expressed in numbers of 16 bits or over, for example, up to 24 bits. In the exemplary embodiment of the invention under discussion, the subbands 1 to M all have the same width. This is not a necessity, however.

In a publication, by M. A. Krasner, entitled "The Critical Band Coder—Digital Encoding of Speech Signals Base on the Perceptual Requirements of the Auditory System" in IEEE ICASSP 80, Vol. 1, pp. 327-331, Apr. 9-11, 1990 a subdivision into a plurality of subbands is provided whose bandwidths approximately correspond to the bandwidths of the critical bands of the human auditory system in the respective frequency areas.

The operation of the splitter 2 will not further be explained since the operation of such a device has already been described extensively hereinbefore. For this purpose, reference is made to the above-mentioned Krasner publication and U.S. Pat. Nos. 4,896,362 and 5,214,678 which are incorporated herein by reference.

Figure 1A:
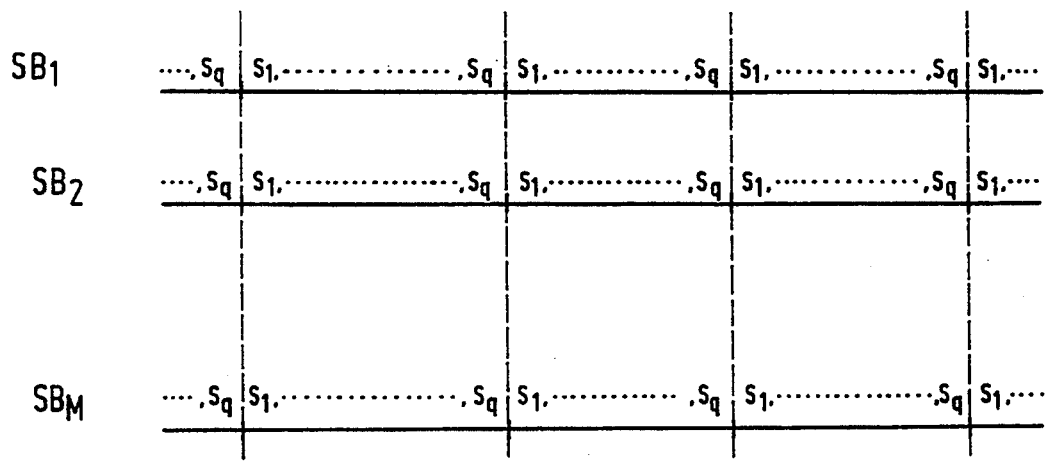
FIG. 1a shows the corresponding (i.e., time-equivalent) signal blocks in the subband signals $SB_1$ to $SM_M$, each signal block comprising q samples.

The samples in each subband signal are grouped as successive signal blocks of q successive samples, for example q may be equal to 12, see FIG. 1a, and are applied to corresponding quantizers $Q_1$ to $Q_M$. In a quantizer $Q_m$, the samples of a signal block are quantized to obtain quantized samples, each quantized sample having a number of bits $n_m$ which is smaller than 16.

Figure 2:
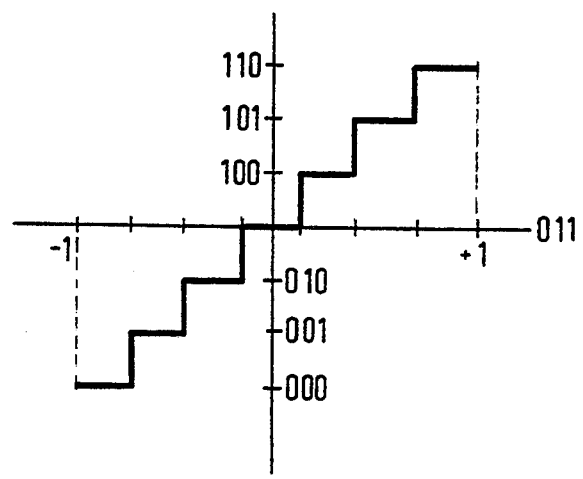
FIG. 2 shows the quantization to a three-bit binary representation.

FIG. 2 shows quantization using a 3-bit binary representation. During the process of quantization, the q samples in each of the signal blocks (groups of the subband signals) are each normalized and then quantized using a number of bits 3 in the example of FIG. 2. Normalization is performed by dividing the amplitudes of the q samples by the amplitude of the sample having the largest absolute value in the signal block. The amplitude of the sample having the largest amplitude in a signal block of a subband signal $SB_m$ yields the scale factor $SF_m$ for that signal block, (see copending U.S. patent application Ser. No. 07/997,158 filed Dec. 21, 1992 and incorporated herein by reference). Subsequently, the amplitudes of the normalized samples, which are now situated in an amplitude range from $-1$ to $+1$, are quantized according to FIG. 2.

This implies that normalized samples in the amplitude range between $-1$ and $-0.71$ are quantized with the 3-bit number 000, samples in the amplitude range from $-0.71$ to 0.42 are quantized with 001, samples in the amplitude range from 0.42 to 0.14 are quantized with 010, samples in the amplitude range from $-0.14$ to 0.14 are quantized with 001, samples in the amplitude range from 0.14 to 0.42 are quantized with 100, samples in the amplitude range from 0.42 to 0.71 are quantized with 101 and samples in the amplitude range from 0.71 to 1.00 are quantized with 110. In copending application Ser. No. 07/997,158, mentioned above, three-bit quantization is extensively discussed (see FIGS. 24, 25 and 26 and the relevant descriptions in that document).

The quantized samples in the subband signals $SB_1$ to $SB_M$ are thereafter available at the respective outputs 4.1 to 4.M. See FIG. 1.

Furthermore, the outputs 3.1 to 3.M of splitter 2 are coupled to the respective inputs 5.1 to 5.M of a bit need determining circuit 6. The bit need determining circuit 6 determines the bit need $b_m$ for the corresponding (i.e., time-equivalent) signal blocks of q samples of the subband signals $SB_1$ to $SB_M$. The bit need $b_m$ is a number related to the number of bits with which each of the q samples in a signal block in a subband signal should be quantized.

The bit needs $b_1$ to $b_M$, derived by the bit need determining circuit 6, are applied to a bit allocation circuit 7. The bit allocation circuit 7 determines the actual number of bits $n_1$ to $n_M$ with which the q samples of the corresponding signal blocks in the subband signals $SB_1$ to $SB_M$ are to be quantized. Control signals corresponding to the numbers $n_1$ to $n_M$ are applied to the respective quantizers $Q_1$ to $Q_M$ through lines 8.1 to 8.M, so that the quantizers can quantize the samples with the correct number of bits.

The following will provide an explanation of the operation of the bit need determining circuit 6 and the bit allocation circuit 7. The bit needs for the time-equivalent signal blocks of q samples in each of the subband signals $SB_1$ to $SB_M$ are derived from estimates of the power $v_m$ and the scale factor $SF_m$ of the signal block in the subband signal $SB_m$.

The power $v_m$ may, for example, be estimated by means of the following formula:

$$v_m = \frac{1}{q} \sum_{i=1}^{q} s_i^2 \qquad \text{EQ(1)}$$

where $s_i$ is the amplitude of the $i^{th}$ sample in the q-sample signal block of the subband signal $SB_m$, the scale factor $SF_m$ being equal to the amplitude of the sample in the signal block having the largest absolute value, as has already been observed hereinbefore. It should be observed in this context that the estimate for the power $v_m$ in a signal block of the subband signal $SB_m$ might also be estimated by assuming that $v_m$ is equal to the squared scale factor $SF_m$.

For all corresponding signal blocks in the subband signals $SB_1$ to $SB_M$, the power $v_m$ and the scale factor $SF_m$ are determined in this fashion. The powers are ordered as a vector $\{v\}$. By multiplying the vector $\{v\}$ by an $M \times M$ matrix $[D]$, one will obtain a vector $\{w\}$ from the following formula:

$$\{w\} = [D]\{v\} + \{w_r\} \qquad \text{EQ. (2)}$$

In this formula, $[D]$ is a matrix whose coefficients $d_{ij}$ denote the coefficient by which the power $v_j$ of the q-sample signal block of the subband signal $SB_j$ is to be multiplied to calculate the masked power in the subband i for subband signal $SB_i$ due to the signal in the q-sample signal block of the subband signal $SB_j$, and $w_{r,i}$ is the coefficient in the vector $\{w_r\}$ which denotes the masking threshold in the subband i for subband signal $SB_i$. Thus, $w_{r,m}$ bears a relation to the maximum power of a signal in a subband m in which that signal will not be audible.

The vector $\{w\}$, therefore, has coefficients $w_i$ which are estimates of the masked quantizing noise in each subband i for subband signal $SB_i$. Quantizing-noise in a subband i for subband signal $SB_i$ which has a power of less than $w_i$, is thus inaudible. The coefficients $d_{ij}$ of the matrix $[D]$ can be calculated according Philips Journal of Research, Vol. 44, 329–343, 1989, incorporated herein by reference. The bit need $b_1$ to $b_M$ can be calculated from the following formula:

$$b_m = K_1 \cdot {}^2\log(\sqrt{SF_m^2/3w_m} + 1) \qquad \text{EQ. (3)}$$

more generally the following may hold:

$$b_m = K_1 \cdot {}^2\log(K_2 \sqrt{SF_m^2/w_m} + K_3) \qquad \text{EQ. (4)}$$

The former formula, EQ. (3), can simply be derived from the latter formula, EQ. (4), by assuming: $K_2 = 1/\sqrt{3}$ and $K_3 = 1$, where $K_1$, $K_2$ and $K_3$ are constants, for which it holds that $K_1$ is preferably equal to approximately 1 and $K_2$ is preferably equal to approximately $1\sqrt{3}$. $K_3$ has a wider range of possibilities. It may be assumed that $K_3$ will be less than 10, where $K_3$ will, for example, preferably be taken to be equal to 1 or may be neglected. In addition, in the latter case there will be a simpler implementation of the calculation.

The bit needs $b_1$ to $b_M$ are obtained in this fashion, and they are situated in a specific amplitude range. They may be negative and non-integers. A bit need $b_m$ bears a relation to the number of bits with which the samples in the q-sample signal block of a subband signal $SB_m$ should be quantized, so that it holds that if $b_{m1}$ for subband signal $SB_{m1}$ is greater than $b_{m2}$ for the subband signal $SB_{m2}$, the number of bits with which the q samples in a signal block of the subband signal $SB_{m1}$ should be quantized will have to be greater than the number of bits with which the q samples of the time-equivalent signal block of the subband signal $SB_{m2}$ should be quantized.

Figure 3:
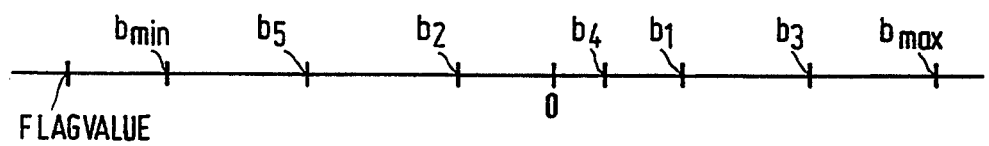
FIG. 3 shows the positions of the bit needs $b_1$, $b_2$, ..., along a value axis.

This is shown in qualitative terms with reference to FIG. 3. In FIG. 3, seven bit needs $b_1$ to $b_5$, $b_{max}$ and $b_{min}$ are plotted along a value axis. $b_{max}$ is the bit need having the maximum value and $b_{min}$ is the bit need having the minimum value. It will be noticed that $b_{min}$, $b_2$ and $b_5$ are negative and that, furthermore, the following holds: $b_{min} < b_5 < b_2 < b_4 < b_1 < b_3 < b_{max}$. In terms of quality, it may now be assumed that q samples in a signal block of subband signal $SB_m$, with $b_m = b_{min}$, should be quantized with the minimum number of bits and the q samples in a signal block of the subband signal $SB_m$, with $b_m = b_{max}$, with the maximum number of bits.

Figure 4:
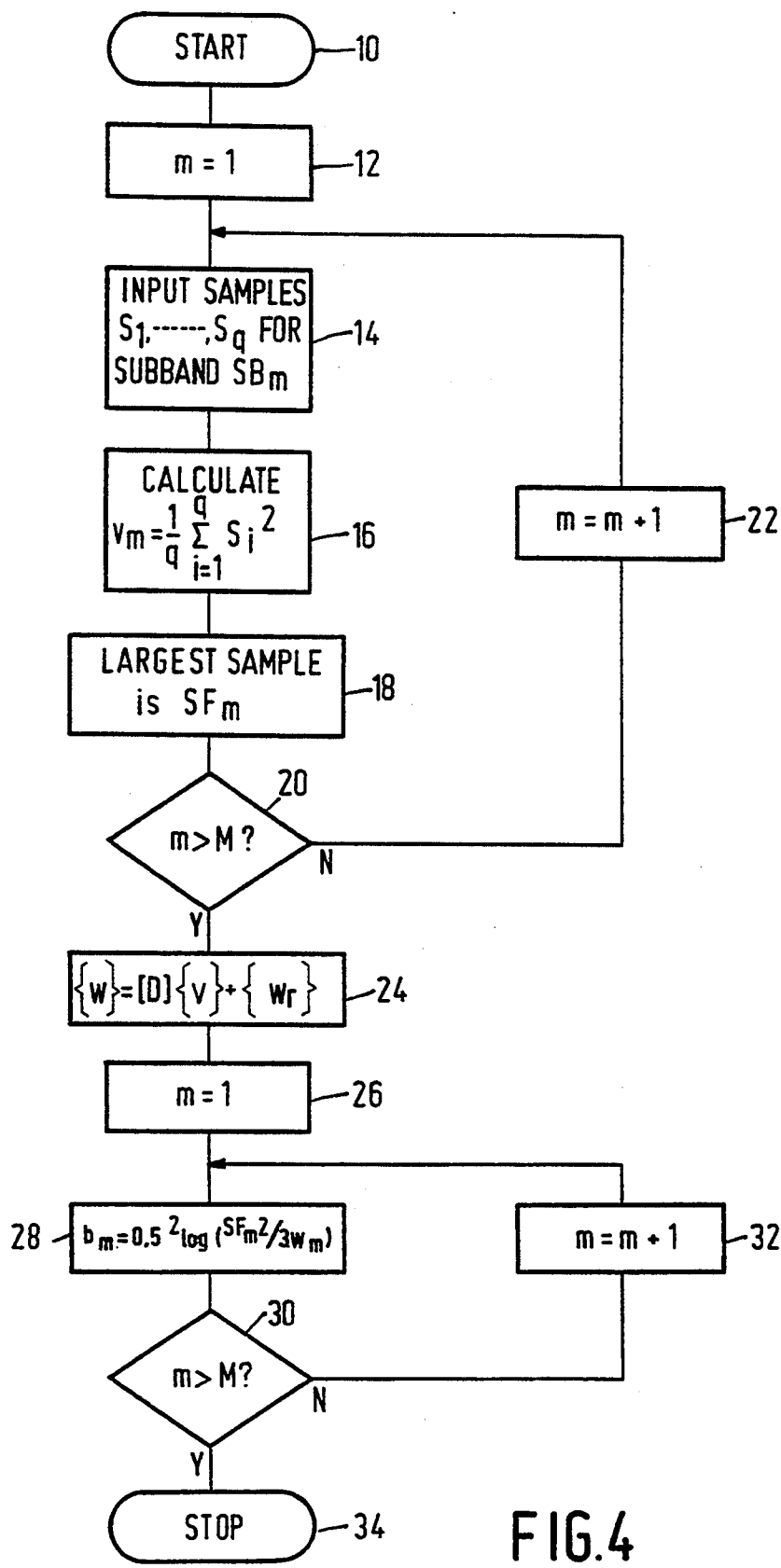
FIG. 4 shows the method of determining the bit needs $b_1$, ..., $b_M$.

FIG. 4 shows a flow chart of the program of operation of the bit need determining circuit 6 for determining the bit needs $b_1$ to $b_M$ for time-equivalent q-sample signal blocks of the subband signals $SB_1$ to $SB_M$. In this case only, a single q-sample signal block of a subband signal is considered. For each successive q-sample signal block of that subband signal, and the signal blocks of the other subband signals corresponding with the aforesaid signal block (in case of a time-parallel subband signal supply), the operation represented in FIG. 4 will be performed once again.

The operation starts at block 10. First, the running variable m is set to 1 (block 12). Then, the q samples $S_1, \ldots, S_q$ in a signal block of a subband signal $SB_m$ are input (block 14) and the power $v_m$ is calculated (block 16). Also the scale factor $SF_m$ (block 18) is determined.

The blocks 14, 16 and 18 are repeated for all corresponding signal blocks of the subband signals via the loop through blocks 20 and 22. If the values $v_m$ and $SF_m$ have been determined for all corresponding signal blocks, the matrix calculation will be performed in order to obtain the vector $\{w\}$ (block 24).

Subsequently, m is again set to 1 (block 26) and the bit need ($b_m$) is determined (block 28) for all corresponding signal blocks of the subband signals via the loop through the blocks 30 and 32 after which the operation is terminated (block 34). The bit needs $b_m$ are determined in block 28 according to the formula stated previously in which the constant $K_1$, $K_2$ and $K_3$ are equal to the values of 1, $1\sqrt{3}$ and 0, respectively.

The program of FIG. 4 shows the time-consecutive calculations of the coefficients $v_1$ to $v_M$ in the vector $\{v\}$, compare the loop through block 22 in the program, and the method shows the time-consecutive calculations of the bit needs $b_1$ to $b_M$, compare the loop through block 32. This is a very suitable method, more specifically, if the corresponding signal blocks having the samples $s_1$ to $s_q$ for the subband signals $SB_1$, $SB_2$, $\ldots$, $SB_{M-1}$, $SB_M$, are applied serially.

If the signal blocks are applied in parallel, the calculation of the coefficients $v_1$ to $v_M$ could be performed in parallel for all subband signals, and, thus, the loop through block 22 is avoided. Likewise, the bit needs $b_1$ to $b_M$ may be calculated in parallel, and this will render the loop through block 32 redundant.

The operation of the bit allocation circuit 7 will now be explained. The flow chart of FIG. 5 for a program will be used for this purpose. The program determines for time-equivalent q-sample signal blocks in the subband signals $SB_1$ to $SB_M$ the values $n_1$ to $n_M$ from the bit needs $b_1$ to $b_M$. Here too, it is a matter of a single signal block having q samples of a subband signal. For directly successive q-samples signal blocks in that subband signal and the time-equivalent signal blocks in the other subband signals, the method of FIG. 5 will be carried out again.

It is now assumed that, after quantization, $B_0$ bits are available for transmitting the overall information connected with the M signal blocks of q samples of, for example, 24 bits each. Assuming that after quantization, R bits are available per sample, averaged over the subbands, it holds that $B_0$ is equal to the largest integer smaller than M.q.R.

In copending application Ser. No. 07/997,158, it is shown that not only are the quantized samples transmitted, but also the scale factors $SF_1$ to $SF_M$ (scale factor information) and the bit allocation information (that is to say, information which bears a relation to the number of bits with which the samples in a signal block in a subband signal are to be quantized, i.e., the values $n_1$ to $n_M$). The bit allocation information is then represented by y=4 bits for each $n_m$. Thus, this implies that, actually, only $B=B_0-y.M$ bits are available for the transmission of M signal blocks of quantized subband signals and the scale factor information.

Copending application Ser. No. 07/997,158 further describes that the y-bit number (y=4) 0000 in the bit allocation information denotes that no samples are transmitted in the relevant subband. In that case, no scale factor information for that subband will be transmitted either. The scale factor information for a subband is represented by means of an x-bit number (x=6).

The method of bit allocation is as follows. The method starts at block 40, FIG. 5. Initially, all numbers $n_m$ are first set to zero. Then an initial bit allocation is performed at block 44. (This initial bit allocation will be explained later). Then, the maximum bit need is determined. This is the bit need $b_j$. In the example of FIG. 3, this would be $b_{max}$. Next, it is considered whether $n_j$ is greater than or equal to a certain value $n_{max}$ (block 48). In the present example, $n_{max}$ is equal to 16. This means that the quantized samples can only be represented by binary numbers with a maximum of 16 bits.

If $n_j$ is greater than or equal to $n_{max}$, the q-sample signal block of the subband signal $SB_j$ will be excluded from the allocation of further bits. For this purpose, the bit need $b_j$ is made equal to a so-called "flag value" (block 66). The flag value is represented in FIG. 3 and is a value smaller than the minimum bit need $b_{min}$. If $c_1$, in the block 56 to be discussed hereinbelow, is greater than unity, $n_j$ might be greater than $n_{max}$. In addition, $n_j$ will then be assumed to be equal $n_{max}$ at block 66.

If $n_j$ is equal to zero (block 50), the program will proceed through the blocks 52 and 54. At block 54, $a_1$ bits are initially allocated to the signal block of subband signal $SB_j$. This means $n_{j=a_1}$. The total number B of available bits now decreases by $a_1.q+x$. The q quantized samples of the signal block in the subband signal $SB_j$ are represented each by $a_1$ bits and, in addition, an x-bit-long scale factor $SF_j$ is to be added. Furthermore, in block 54, the bit need $b_j$ is decreased by a value $a_2$. If $n_j$ is unequal to zero, the program will proceed through block 56. The number of bits $n_j$ is now increased by $c_1$. The total number B of available bits now decreases by $c_1.q$, due to the fact that the q quantized samples of a signal block are now represented by an additional number of $c_1$ bits.

Naturally, bit allocation only takes place if there are still sufficient bits available. Therefore, block 52 is present. If there are insufficient bits available the program will proceed through block 66 at which the relevant bit need $b_j$ is again made equal to the flag value. The signal block in the subband concerned is then excluded from further bit allocation.

As long as there are bit needs that have values greater than the flag value (block 58) and as long as there are still sufficient bits available (block 60), the program will return through circuit 62 to block 46 for a next calculation of the maximum bit need. If all bit needs $b_m$ are smaller than or equal to the flag value, the program will stop. The program will also stop if there are insufficient bits to be allocated (block 60).

The method is characterized in that when a first bit allocation is performed (block 54), the number of allocated bits ($a_1$) is greater than the number of bits of one or more subsequent allocations (block 56) ($c_1$), worded differently $a_1>c_1$. Furthermore, it holds that $a_2$ is greater than or equal to unity. Preferably, $a_1$ is equal to $a_2$ and $c_1$ equal to $c_2$. $a_1$, $a_2$, $c_1$ and $c_2$ are numbers greater than zero. $a_1$ and $c_1$ are preferably integers. But, this is not a necessity. An example may be shown for this purpose.

It is assumed that one wishes to quantize the q samples in a signal block in five levels. For this purpose, 3 bits are needed per sample. However, this is not an efficient encoding because a subdivision into seven levels of 3 bits is possible.

If, however, three samples are combined, these three samples each with five signal levels will present 125 options. These 125 options may be represented by means of a 7-bit binary number. Thus, no more than 7/3 bits per sample. $n_m$ would in that case be equal to 7/3. This will provide a more efficient encoding.

It has been indicated hereinbefore that when the quantized samples are transmitted, both scale factor information and bit allocation information are co-transmitted. The scale factor information then has the form of x-bit words, of which each x-bit word denotes a scale factor $SF_m$ that belongs to the q samples in a signal block of the subband signal $SB_m$. The bit allocation information then has the form of y-bit words, of which each y-bit would denotes a number of bits $n_m$ by which each sample in a signal block of the subband signal $SB_m$ is represented. This is described in copending application Ser. No. 07/997,158.

If in the bit need determining circuit 6 only the scale factors $SF_m$ are used for calculating the powers $v_m$, that is to say, because $v_m$ is assumed to be equal to the square of $SF_m$, the bit allocation information need not be co-transmitted. On the receiver side, the bit needs $b_1$ to $b_M$ can be derived from the transmitted scale factors $SF_m$ and, on the basis of these needs, the magnitudes $n_1$ to $n_M$, while implementing the calculation method as discussed hereinbefore. Thus, the receiver likewise comprises a bit need determiner which derives the powers $v_m$ from the scale factors $SF_m$ and derives from these powers the bit needs $b_m$, and also includes a bit allocator which is capable of calculating the magnitudes $n_1$ to $n_M$ on the basis of the bit needs $b_m$ and the available bit quantity, which in this case is equal to $B_0$. Since, as observed hereinbefore, $B=B_0-y.M$, the latter method is advantageous in that more bits can be allocated to the subbands.

It may sometimes be necessary to pre-allocate a number of bits to a signal block of a subband signal $SB_m$, for example, in the case where there are signal blocks which must be quantized with more than zero bits irrespective of their bit need. The reason for this is that the signal blocks (namely subsequent signal blocks of one subband signal) must not be switched on or off in an unqualified manner. This would produce audible effects.

It may sometimes also be necessary or useful to exclude a signal block in advance from bit allocation.

Figure 5:
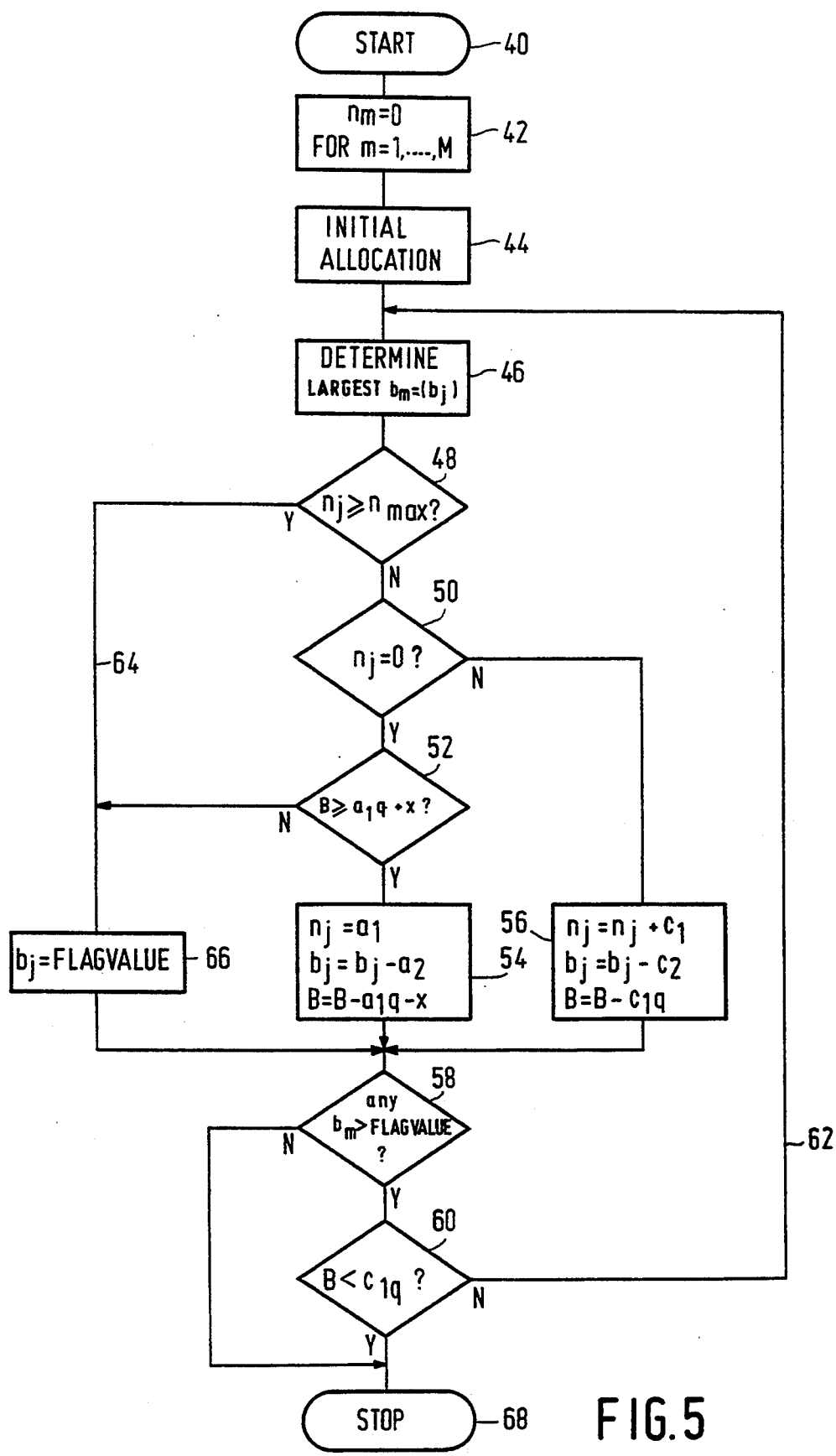
FIG. 5 shows the method of allocating bits to the signal blocks of the subband signals in the subbands.

For these purposes, block 44 in the program of FIG. 5 is inserted. FIG. 6 shows an elaboration of block 44. In FIG. 6, the first two signal blocks are the signal blocks of the subband signals $SB_k$ and $SB_l$ to which have been pre-allocated a number of bits $A_{k0}$ or $A_{l0}$. This implies that $n_k = A_{k0}$ and $n_l = A_{l0}$. From the bit needs $b_k$ and $b_l$, the respective values $A_{k1}$ and $A_{l1}$ are subtracted, and the remaining number of bits B is reduced by $A_{k0} \cdot q - x$ and $A_{l0} \cdot q - x$ respectively. Actually, for $A_{k0}$ and $A_{l0}$ the same holds as for $a_1$. Preferably, $A_{k0} = A_{l1} = a_1$. For $A_{k1}$ and $A_{l1}$ the same holds as for $a_2$. Preferably, $A_{k1} = A_{l1} = a_2$. The signal blocks of the subband signals $SB_k$ and $SB_l$ may naturally be allocated more bits, as required, at block 56 of the method presented in FIG. 5.

Furthermore, at block 44 of FIG. 6, it is shown that the signal block of the subband signal $SB_f$ is excluded from bit allocation. For this purpose, the bit need $b_f$ for this signal block is made equal to the flag value.

Figure 11:
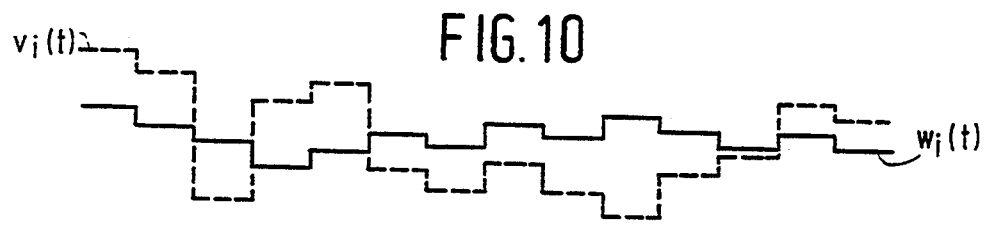
FIGS. 11, 12a, 12b, and 13 show the different allocation stages in dependence on the power value $v_i$.
Figures 12A, 12B:
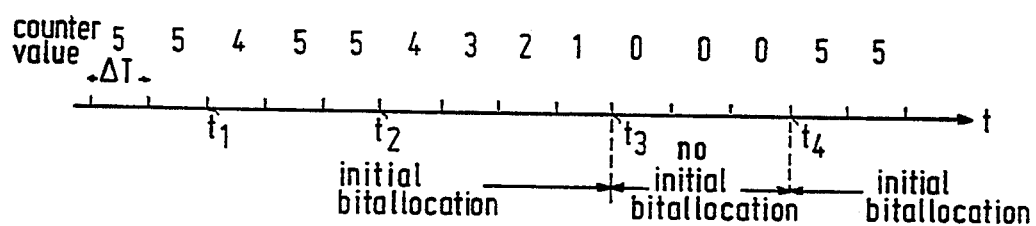
Figure 13:
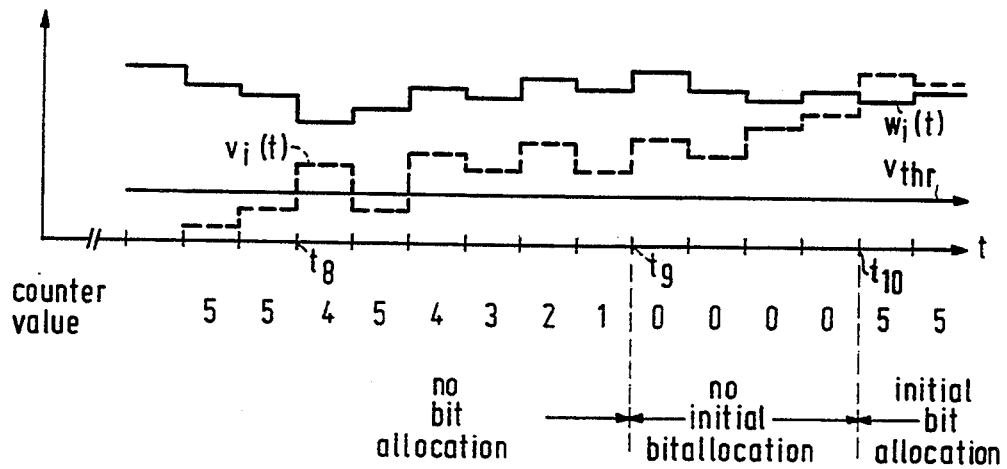

FIGS. 11, 12 and 13 represent the situations in which there is initial bit allocation, no initial bit allocation or no bit allocation to the subbands. The Figures show the consecutive time intervals ΔT in which a group of M corresponding signal blocks of the M subband signals are processed. In each time interval the power $v_i(t)$ and the magnitude $w_i(t)$ are determined for each subband signal $SB_i$ block. If $v_i(t)$ is greater than $w_i(t)$, there will be initial bit allocation to the subband signal $SB_i$ block. As will be evident from FIG. 11, this holds for periods of time situated before $t = t_1$.

Figure 14:
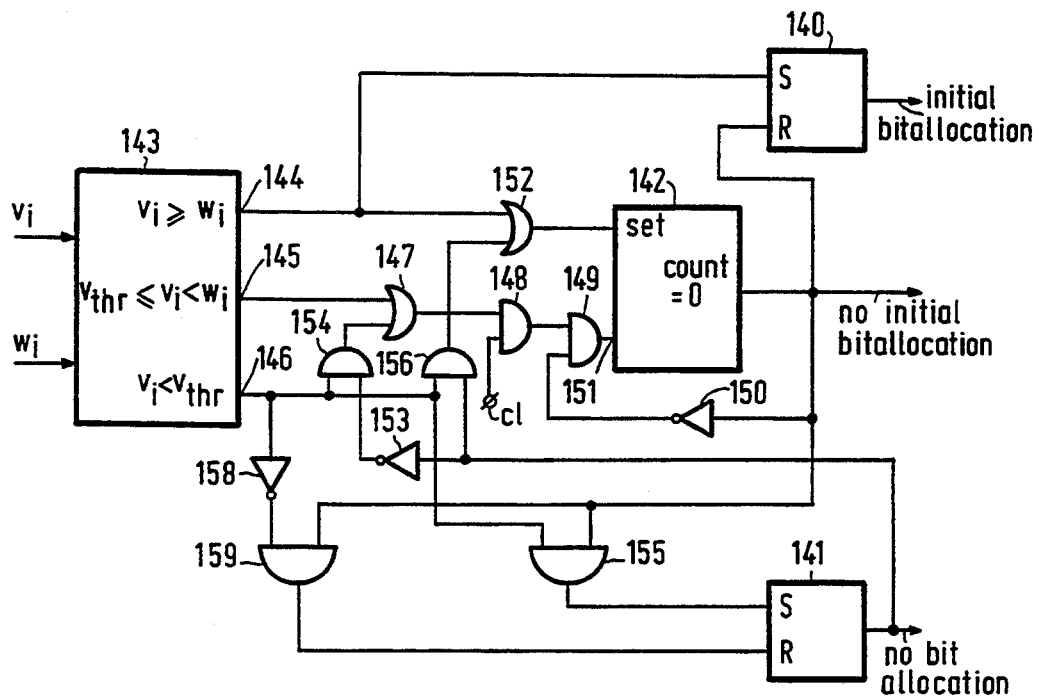
FIG. 14 shows a functional block diagram of the unit for generating the control signals required in the different allocation stages.

FIG. 14 is a block diagram of a circuit by means of which, on the basis of the magnitudes $v_i$ and $w_i$, control signals may be derived which denote whether initial bit allocation is to take place, in which case the output of the SR flip-flop 140 is "high" or "logic 1"; whether no bit allocation is to take place, in which case the output of the SR flop-flop 141 is "high"; or whether no initial bit allocation is to take place, in which case the output of a counter 142 is "high". In the latter case, bits may still be allocated to the subband signal block in question, but the allocation then takes place at block 54 and/or at block 56 according to the method of FIG. 5. These control signals may thus be applied to block 44 in FIG. 6 and denote what functions are to be performed in this block.

At the instant $t = t_1$, FIG. 11, $v_i(t)$ becomes smaller than $w_i(t)$. The output 144 of the comparator 143 now becomes "low" whereas the output 145 of this comparator becomes "high". Through the OR-gate 147, this "high" signal is applied to the AND-gate 148 so that clock pulses are passed to the AND-gate 149 at a rate f equal to 1/ΔT. Since a "high" signal is applied to the other input of the AND-gate 149 through the inverter 150, the clock pulses are passed to the input 151. The counter 142 now counts down from the initial position 5 (decimal under the influence of the clock pulses. Since the output of the counter 142 remains "low", the position of the flip-flop 140 does not change so that the initial bit allocation is maintained.

One time interval later, $v_i(t)$ is again larger than $w_i(t)$. The output 144 of the comparator 143 becomes "high" again, which implies that the rising edge is fed to the set input of the counter 142 through the OR-gate 152. The count of counter 142 is reset to 5 (decimal). At the instant $t_2$, FIG. 11, $v_i(t)$ again becomes smaller than $w_i(t)$. Now, $v_i(t)$ remains smaller than $w_i(t)$ for a sufficiently long period of time to make it possible for the counter 142 to count back until the 0 count (decimal) is reached. This is reached at the instant $t = t_3$, FIG. 11. At that moment, the output of the counter 142 becomes "high". The flip-flop 140 is reset. Through inverter 150 and AND-gate 149 the counting operation of counter 142 is blocked so that it retains the 0 count.

Initial bits are no longer allocated to this subband signal block. At the instant $t = t_4$, FIG. 11, $v_i(t)$ again becomes larger than $w_i(t)$. The counter 142 is reset to the count 5 and, in addition, the flip-flop 140 is set in a manner so that initial bits are again allocated.

FIG. 12a represents a situation in which $v_i(t)$, prior to the instant at which the counter 142 is reset to zero, already becomes smaller than a specific threshold value $v_{thr}$. At the instant $t = t_5$, the output 145 of the comparator 143 becomes "low" again and the output 146 "high". Since the inverter 153 applies a "high" signal to one input of the AND-gate 154, the "high" signal is conveyed to the AND-gate 148 through the AND-gate 154 and the OR-gate 147. The counter 142 continues to count. The phase of the initial bit allocation is thus maintained until the count 0 (decimal) is reached. The output of the counter 142 now briefly rises. This entails that flip-flop 141 is set through the AND-gate 155. Through the AND-gate 156 and the OR-gate 152 the "high" signal of the flip-flop 141 is applied to the set input of the counter 142, which immediately afterwards jumps to count 5 (decimal). In addition, the further down-counting of the counter 142 is blocked because the inverter 153 applies a "low" signal to the one input of the AND-gate 154. From instant $t_6$ onwards there is no bit allocation whatsoever to the relevant subband signal block.

FIG. 12b represents the situation in which $v_i(t)$ has remained in the range between $v_{thr}$ and $w_i(t)$ sufficiently long so that the phase of "no initial bit allocation" has commenced. At the instant $t_7$, $v_i$ will be smaller than $v_{thr}$. At that moment, the output 145 will become "low" and the output 146 "high". At that moment, the flip-flop 141 is set through the AND-gate 155 and the counter 142 is reset to the count 5 through the AND-gate 156 and the OR-gate 152. The output of the counter 142 thus becomes "low" and the output of the flip-flop 141 "high". There is bit allocation.

FIG. 13 shows a situation in which $v_i(t)$ increases again. At the instant $t_8$, $v_i(t)$ becomes larger than $v_{thr}$. The output 145 becomes "high" so that the counter 142 may count down. One time interval later $v_i(t)$ is again smaller than $v_{thr}$. The output 146 becomes "high" again so that the counter is reset to the count of 5 through the AND-gate 156 and the OR-gate 152. If $v_i(t)$ is greater than $v_{thr}$ for a sufficiently long period of time, the counter 142 can count down to zero. At $t = t_8$, the output of counter 142 becomes "high". Through the AND-gate 159, to which a "high" signal is applied through the inverter 158, the flip-flop 141 is reset, so that at this moment the phase of "no bit allocation" is terminated and changed into the phase of "no initial bit allocation".

In the following, a simplified calculation of the bit need $b_m$ will be explained. In this calculation, a logarithmic representation is used for the various magnitudes which play a part in the calculation. This is possible because with respect to the calculation of the bit needs $b_1$ to $b_M$ the concern is relative, not absolute, precision of the bit needs.

In logarithmic representation, a number g is approximated by $g=r^k$, where r is a fixed base greater than unity and the power k is selected to be an integer. The number g is approximated in the best possible way by a correct choice of k. The integer k is used as a representation of g. In the calculation for the bit need $b_m$, there are both multiplications of two numbers and additions of two numbers. Multiplications in the logarithmic representation correspond with the addition of the powers. That is to say, if $g_1 = r^{k_1}$ and $g_2 = r^{k_2}$, the logarithmic representation of $g_1 \cdot g_2$ will be equal to $k_1 + k_2$.

For the logarithmic representation of additions of these two numbers $g_1$ and $g_2$, the following holds. Assuming that $g_1 > g_2$, it holds that $g_1 + g_2 = r^{k_1} + T(k_1 - k_2)$. The logarithmic representation for $g_1 + g_2$ is thus equal to $k_1 + T(k_1 - k_2)$. $T(k_1 - k_2)$ and is a correction factor in the form of an integer which may be derived from a Table. FIG. 7 shows a Table of this type for $r = 2^{1/16}$. The value for r equalling $2^{1/16}$ can be obtained from an accuracy analysis of the bit needs $b_m$.

It may further be inferred that the calculation of the bit need $b_m$ in a logarithmic representation with a properly selected base r, in lieu of the customary calculations in a linear fixed-point representation, considerably reduces the word widths of the numbers. In addition, no multiplier-accumulator is necessary for calculating the vector {w}, but only a simple accumulator and a Table having a restricted number of entries. The Table of FIG. 7, for example, narrows down to a ROM having contents smaller than 0.5 kbit. The series of numbers stored in the ROM is relatively small. In addition, these numbers are arranged in a specific order. Therefore, it is possible to reduce the look-up Table even more at the cost of some logic.

It should be observed in this context that the logarithmic representation for the addition of two numbers as described hereinbefore is known per se by the name of Zech logarithm and described in the F. J. MacWilliams et al. publication entitled "The Theory of Error Correcting Codes" (North Holland Publishing Co. 1983), compare, more specifically, chapter 3, section 4, page 191.

The bit need determining circuit 6 and the bit allocation circuit 7 may be realized as software. However, hardware designs are also possible. For example, FIG. 8 shows a hardware design of the bit need determining circuit 6.

Figure 8:
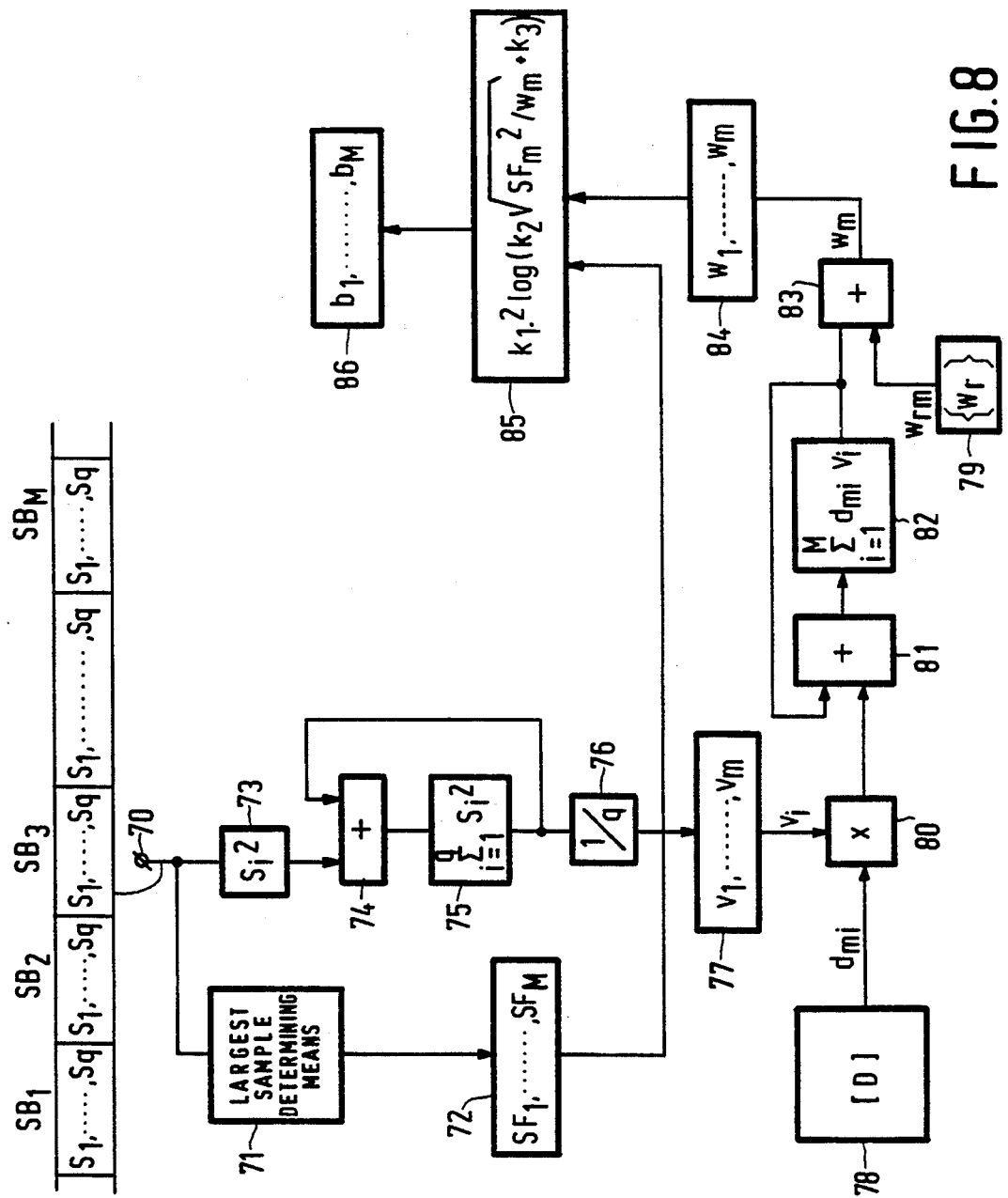
FIG. 8 shows a functional block diagram of the bit need determiner.

FIG. 8 shows the corresponding signal blocks of the subband signals $SB_1$ to $SB_M$, which are serially applied to input 70. The first sample $s_1$ of the subband signal $SB_1$ is applied first and the last sample $s_q$ of the subband signal $SB_M$ is applied last.

In the largest sample determining unit 71, the largest sample, i.e., $SF_m$, is determined for each signal block, which value is then stored in a memory 72. In a squaring unit 73, the samples are squared and thereafter applied to an input of an adder 74. The output of the adder 74 is coupled to an input of a memory 75. The output of that memory 75 ms coupled both to a second input of the adder 74 and an input of a divider 76. The elements referenced 74, 75 and 76 determine the magnitude $v_m$ for each signal block, compare block 16 in FIG. 4. To this end, the first sample $s_1$ of a signal block 3 of the subband signal $SB_m$ is squared in the squaring unit 73 and, in adder 74, added to the value stored in memory 75, which value is momentarily zero, and thereafter stored in the memory 75. Subsequently, the second sample $s_2$ is squared, added to the value stored in memory 75 and then stored in that memory. This is continued until the last sample $s_q$ of the signal block of the subband signal $SB_m$ is squared and added to the value stored in memory 75. The sum thus obtained in the memory 75 is equal to $$\sum_{i=1}^{q} s_i^2$$

which then, after a division by q in the divider 76, is stored as a coefficient $v_m$ in memory 77. Similar calculations are made for the corresponding signal blocks of the further subband signals until all coefficients of the vector {v} have been stored in the memory 77. The bit need determining circuit 6 further includes a memory 78 for storing the matrix coefficient $d_{m1}$ of the matrix [D] and a memory 79 for storing the coefficients $w_{r,m}$ of the vector {$w_r$}. Outputs of the memories 77 and 78 are coupled to inputs of the multiplier 80. An output of the multiplier 80 is coupled to a first input of an adder 81 whose one output is coupled to the input of a memory 82. The output of the memory 82 is coupled both to a second input of the adder 81 and to a first input of an adder 83.

The elements referenced 80, 81 and 82 are intended to perform the matrix multiplication [D]{v}. During this operation, the value $d_{m1}$ from memory 78 is multiplied by the value $v_1$ from memory 77, and the result is added by adder 81 to the value present in memory 82 at that moment, which is zero, and then stored in memory 82. After this, $d_{m2}$ is multiplied by $v_2$, and the result is added to the value stored in memory 82. This is continued until $d_{mM}$ is multiplied by $v_M$, and the result is added to the value stored in memory 82. At that moment, the value $$\sum_{i=1}^{M} d_{mi} v_i$$

is stored in memory 82. In adder 83, the value $w_{r,m}$ stored in memory 79 is added to this result. The value $w_m$ thus obtained is stored in memory 84. This procedure is reiterated for the corresponding signal blocks in the further subbands until all coefficients of the vector {w} are stored in memory 84.

Subsequently, for each subband signal $SB_m$ block, the magnitudes $SF_m$ and $w_m$ are read from the memories 72 and 84 and applied to the calculation unit which eventually determines the bit need $b_m$. This bit need is stored in a memory 86. This calculation is also performed for the further time-equivalent blocks of the subband signals until all bit needs $b_1$ to $b_M$ are stored in the memory 86.

The procedure may be reiterated for a successive series of M signal blocks. Also, the arrangement shown in FIG. 8 utilizes the fact that there is serial information supply. If the signal blocks were supplied in parallel, the calculation could largely be performed in parallel. This means, for example, that the circuit comprising the elements 71, 73, 74, 75 and 76 could occur M times in the arrangement. The circuit comprising elements 80, 81, 82 and 83 could then likewise occur M times.

Figure 9:
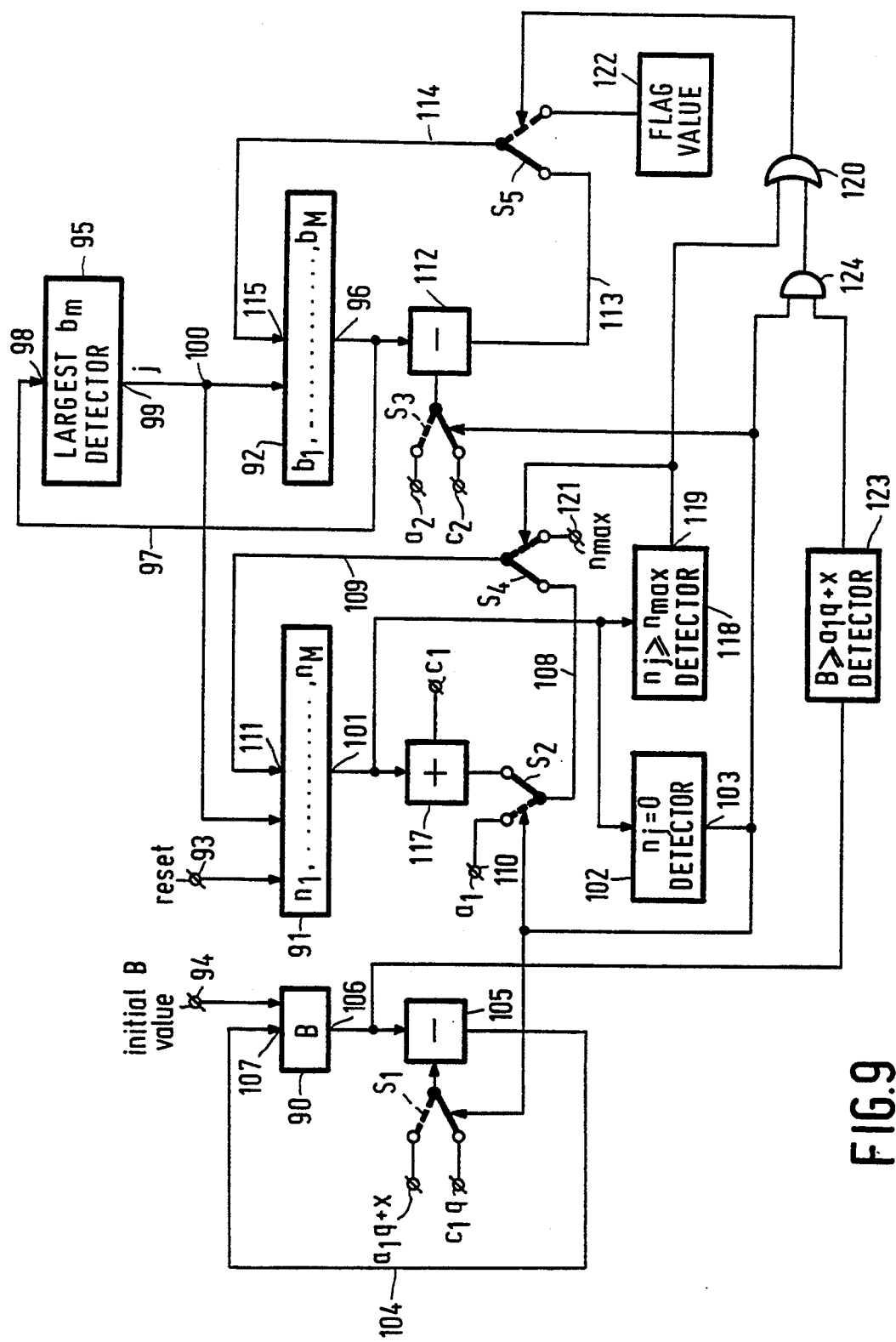
FIG. 9 shows a functional block diagram of the bit allocator.

FIG. 9 shows a block diagram of an embodiment of the bit allocation circuit 7. The bit allocation circuit comprises a memory 90 in which the number of bits B still to be allocated have been stored, a memory 91 in which the values $n_1$ to $n_M$ are stored and a memory 92 in which the bit needs $b_1$ to $b_M$ have been stored. This memory 92 could correspond with memory 86 of FIG. 8. At the beginning of an allocation cycle, the initial value for B is stored in memory 90, which value is available at terminal 94. Furthermore, the initial values for the bit needs $b_1$ to $b_m$ have been stored in memory 92, whereas memory 91 stores all zeros fed to terminal 93 by means of reset signals.

Subsequently, detector 95 determines the maximum value of the bit needs stored in memory 92. This may, for example, be realized by successively reading out all bit needs $b_1$ to $b_M$ at the output 96 and applying these bit needs through line 97 to the input 98 of the detector 95. At the output 99, the detector 95 provides the index of the maximum bit need $b_j$. This index j is used as an address for addressing, through line 100, the locations in the memories 91 and 92 in which the values are stored for $n_j$ and $b_j$, respectively, so that these values are available at the respective outputs 101 and 96. Output 101 is coupled to an input of an $n_j=0$ detector 102. If the detector 102 detects $n_j=0$, it provides at output 103 a control signal which is applied to control signal inputs of controllable switches $S_1$, $S_2$ and $S_3$. These switches then assume different positions from the ones shown in FIG. 9. This results in a subtractor 105 subtracting the value $a_1.q+k$ from the value B available at output 106 of memory 90, and this new value is again applied to input 107 of this memory through line 104 so that the new value is stored in memory 90. Furthermore, through lines 108 and 109 the value $a_1$, which is available at terminal 110, is applied to the input 111 of memory 91. Switch $S_4$ then has the position shown in FIG. 9, and $a_1$ is stored in memory 91 as a new value for $n_j$. In the subtractor 112, the value $a_2$ is subtracted from the value $b_j$ available at the output 96 of memory 92. The value, thus obtained, is applied to input 115 through lines 113 and 114, while switch $S_5$ has the position shown in FIG. 9, so that the new value for $b_j$ can be stored in the memory location $b_j$ in memory 92. The sequence described hereinbefore corresponds to the method as denoted in block 54 in FIG. 5.

If the detector 102 detects that $n_j$ is unequal to zero, no (or a different) control signal is generated. Switches $S_1$, $S_2$ and $S_3$ then have the positions shown in FIG. 9. The value $c_1.q$ is now subtracted from the value B stored in memory 90, and the result, thus obtained, is stored again in memory 90. In the adder 117, the value $c_1$ is added to the value $n_j$, which is read from the memory 91 through output 101. Again, through lines 108 and 109, the new value for $n_j$ is applied to input 111 of memory 91 to be stored in the memory 91. Furthermore, in subtractor 112, the value $c_2$ is subtracted from the value $b_j$ present at the output 91, and the value, thus obtained, is applied to input 115 through lines 113 and 114 in order to be stored in memory 92. This sequence corresponds with block 56 of the method shown in FIG. B.

In the method of FIG. 5, there is further shown a block 48 for making a decision as is whether $n_j \geq n_{max}$?. If it is, $b_j$ is made equal to the flag value (block 66 in FIG. 5), and $n_j$ is made equal to $n_{max}$ (should it turn out to be necessary). In the circuit of FIG. 9, this has been taken into account by means of the $n_j \geq n_{max}$ detector 118. If detector 118 detects a situation in which $n_j \geq n_{max}$ it generates at its output 119 a control signal which is applied to the control input of the controllable switch $S_4$ and, through an OR-gate 120, to the control input of the controllable switch $S_5$, which switches then assumes positions different from the ones shown in FIG. 9. The value $n_{max}$, applied to the terminal 121, is now applied to the input 111 of memory 91. $n_{max}$ is then stored in the memory location for $n_j$ in memory 91. Accordingly, the flag value, block 122, is applied to input 115 so that the flag value is stored in the memory location for $b_j$ in memory 92.

It will be evident that there is a central control unit (not shown) which detects the output signal of detector 118 and, on detection of this signal, applies only load pulses to the memories 91 and 92 for storing there $n_{max}$ and the flag value. No load pulse is then applied to memory 90, since the value B in the memory is to remain unchanged.

Furthermore, the flag value is allocated to $b_j$ if both $n_j$ is equal to zero and $B \geq a_1.q+x$ (see the blocks 50, 52 and 66 in FIG. 5). Thus, the circuit of FIG. 9 includes the detector 123 and the AND-gate 124. At the occurrence of detection signals of both detector 103 and detector 123, switch $S_5$ is again set to the opposite position shown in FIG. 9, and the flag value $b_j$ is stored in memory 92 in location j. In this case, the central processor will generate a load pulse only for memory 92 and no load pulses for memories 90 and 91.

It will be self-evident that the initial bit allocation as described with reference to FIG. 6 may also be implemented here, for examples controlled by the necessary control and address signals from the central controller. This will not be explained any further because after the above explanation it may be assumed to be within the grasp of those skilled in the art.

Figure 10:
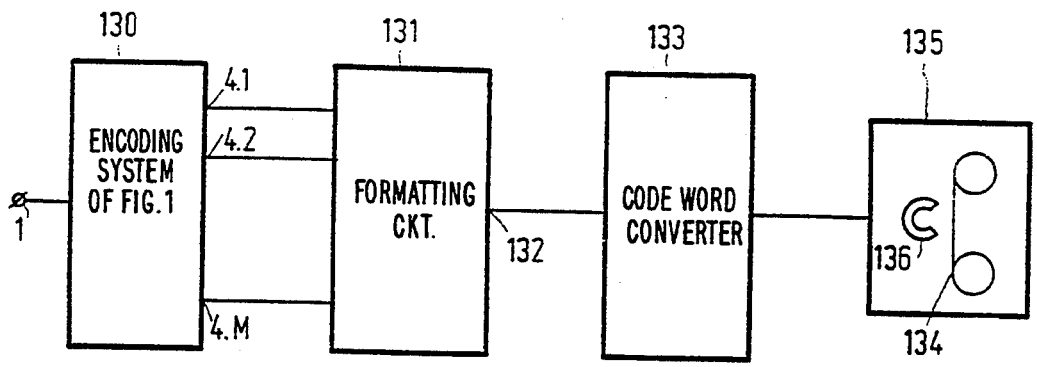
FIG. 10 shows the use of the encoding system of FIG. 1 in a transmitter in the form of a recording arrangement for recording the quantized subband signals on a magnetic record carrier.

FIG. 10 shows the use of the encoding system as described hereinbefore, in a transmitter, especially a transmitter in the form of a recording arrangement for recording the quantized subband signals in one or more tracks on a magnetic record carrier. The section referenced 130 is the encoding system of FIG. 1, (i.e., a subband coder) discussed hereinbefore, which produces the quantized subband signals at the outputs 4.1 to 4.M. The section referenced 131 is a formatting circuit which assembles the quantized subband signals into an encoded output digital signal which is available at output 132. This encoded output digital signal comprises successive frames of which the format is extensively discussed in copending patent application Ser. No. 07/997,158. The structure of the formatting circuit 131 is also explained in that document.

The section referenced 133 is a code word converter which renders the encoded output digital signal suitable for recording on a record carrier, for example, a magnetic record carrier 134. The converter 133 comprises an 8-to-10 converter. In a converter of this type, 8-bit data words in the serial information stream are converted to 10-bit code words. Furthermore, interleaving may take place. The object of this is to enable error correction of the received information on the receiver side (when reproducing the data on the record carrier).

The output signal of converter 133 is applied to a recorder 135 by which the signal is recorded in one or more longitudinal tracks on the record carrier 134. The recorder 135 comprises one or more recording heads 136.

For a further explanation of the arrangement of FIG. 10, copending U.S. patent application Ser. No. 07/669,136 filed Mar. 13, 1991 should be referred to, which is also incorporated herein by reference.

It should further be observed that the invention is not restricted only to the depicted exemplary embodiments. Various modifications of the embodiments described are feasible without departing from the scope of the invention as defined in the claims.

In the foregoing the bit need determination and bit allocation have been described for a number of M subband signals, when there is a single subband signal (for example, a mono signal) in each subband. However, the invention may also be applied to a system for subband encoding of a stereo signal. This means that there will be two subband signals in each subband, that is to say, a left and a right subband signal. Two alternative ways of subband encoding of a stereo signal will be briefly discussed hereinbelow.

A first option is to process the left and right subband signals separately in the manner described above. The M subband signals $SB_1$ to $SB_M$ as discussed above are then, for example, the M left subband signals. The procedure discussed hereinbefore is then carried out for these left subband signals. In the bit need determining circuit 6, first the bit needs $b_{l1}$ to $b_{Ml}$ are determined. Thereafter, the numbers of bins to be allocated, i.e., $n_{l1}$ to $n_{Ml}$, are determined in the bit allocation circuit 7. In the procedure discussed above and explained with reference to FIG. 5, the value B was used for the bit allocation, B being equal to the number of available bits. It will be obvious that in the present case just half this number of available bits B is used for determining $n_{l1}$ to $n_{Ml}$. The other half of the number of available bits will then be used for bit allocation to the right subband signals.

The arrangement for the stereo signal subband encoding according to the first option actually comprises twice the arrangement shown in FIG. 1. The second section of the arrangement thus comprises a second splitter, such as the splitter 2, for generating the M right subband signals. Furthermore, another bit need determiner is present, such as circuit 6, which determines the bit needs $b_{lr}$ to $b_{Mr}$, and another bit allocator, such as circuit 7, which derives therefrom the numbers of allocated bits $n_{lr}$ to $n_{Mr}$. Also for this purpose, half the actual number of available bits is available.

According to a second option for subband encoding of a stereo signal, the bit needs $b_{l1}$ to $b_{Ml}$ and $b_{lr}$ to $b_{Mr}$ are derived in the same manner as in the first option. In contradistinction to the first option, however, in which the bit allocation for the left and right subband signals was performed separately, in the second option, the 2M bit needs $b_{l1}$ to $b_{Ml}$ and $b_{lr}$ to $b_{Mr}$ are applied to a bit allocator such as circuit 7, which then naturally has 2M inputs. In this unit the 2M numbers $n_{l1}$ to $n_{Ml}$ and $n_{lr}$ to $n_{Mr}$ are derived in a manner similar to the manner described above with reference to FIG. 5 on the basis of the actually available number of bits. For this purpose, the bit allocator have 2M outputs.

It should further be observed that when a stereo signal is encoded, 2M values for the bit allocation information are concerned, represented each by y bits. This means that for the bit allocation procedure for a stereo signal no more than $B = B_0 - 2.y.M$ bits are available.

We claim:

1. An encoding system for encoding a digital signal having a specific sampling frequency and bandwidth, comprising:

splitter means for dividing the bandwidth of the digital signal into M successive subbands, and generating, in response to the digital signal, M subband signals having reduced sampling frequencies, each of the subband signals being associated with one of the subbands;

quantizing means for quantizing time-equivalent signal blocks of the subband signals, a subband signal $SB_m$ of the subband signals having successive signal blocks which each contain q samples of that subband signal, each sample in a signal block of subband signal $SB_m$ having an amplitude and being quantized by $n_m$ bits, where $n_m$ may vary for different signal blocks of subband signal $SB_m$;

bit need determining means for determining bit needs for the time-equivalent signal blocks, said bit need determining means comprising:

(a) means for estimating power within the time-equivalent signal blocks, the signal block of subband signal $SB_m$ having a power $v_m$;

(b) means for determining scale factors for the time-equivalent signal blocks, a scale factor $SF_m$ for the signal block of subband signal $SB_m$ being determined from a sample therein having a maximum absolute amplitude value;

(c) means for determining masking magnitudes for the time-equivalent signal blocks, the signal block of subband signal $SB_m$ having a masking magnitude $w_m$ which is determined in accordance with the following relationship:

$$w_m = \sum_{i=1}^{M} d_{mi}v_i + w_{r.m},$$

where $d_{mi}v_i$ denotes masked power in the signal block of subband signal $SB_m$ as a result of power $v_i$ in a time-equivalent signal block of a subband signal $SB_i$ of the subband signals, $d_{mi}$ denotes a matrix coefficient in an $M \times M$ matrix by which the power $v_i$ is multiplied to determine the masked power in the signal block of subband signal $SB_m$ as a result of the time-equivalent signal block of subband signal $SB_i$, and $w_{r.m}$ denotes a masking threshold in the signal block of subband signal $SB_m$; and (d) means for determining the following relationship for the time-equivalent signal blocks:

$$b_m = K_1 \cdot {}^2\log(K_2 \sqrt{SF_m^2/w_m} + K_3),$$

where $K_1$, $K_2$ and $K_3$ are constants; and $b_m$ is a bit need for the signal block of subband signal $SB_m$ corresponding to the number of bits by which the q samples in that signal block should be represented, and $b_m$ may vary for different signal blocks of the subband signal $SB_m$; and bit allocation means for allocating bits to the time-equivalent signal blocks from an available number of bits B, $n_m$ bits being allocated to each of the q samples of the signal block of subband signal $SB_m$ in accordance with at least the bit need, $b_m$, for that signal block;

wherein M, m and i are integers such that $1 \leq m \leq M$ and $1 \leq i \leq M$; q and B are integers, where q is greater than unity and B is greater than zero; and $b_m$, $n_m$, $v_m$, $v_i$, $SF_m$, $w_m$, $d_{mi}$ and $w_{r.m}$ are variables, where $n_m$ and $SF_m$ are greater than or equal to zero.

2. The encoding system as claimed in claim 1, wherein $K_1=1$, $K_2=1/\sqrt{3}$ and $K_3$ is preferably equal to either 1 or zero.

3. The encoding system as claimed in claim 2, wherein said means for estimating power estimates the power $v_m$ in the signal block of subband signal $SB_m$ according to the following relationship:

$$v_m = \frac{1}{q} \sum_{j=1}^{q} s_j^2,$$

where $s_j$ is the amplitude of a jth sample in that signal block, j being an integer such that $1 \leq j \leq q$ and $s_j$ being a variable.

4. The encoding system as claimed in claim 1, wherein said means for estimating power estimates the power $v_m$ in the signal block of subband signal $SB_m$ according to the following relationship:

$$v_m = \frac{1}{q} \sum_{j=1}^{q} s_j^2,$$

where $s_j$ is the amplitude of a jth sample in that signal block, j being an integer such that $1 \leq j \leq q$ and $s_j$ being a variable.

5. The encoding systems as claimed in claim 1, wherein said bit need determining means utilizes a logarithmic representation for $d_{mi}$, $v_i$, $w_m$ and $w_{r,m}$ when determining the masking magnitude $w_m$.

6. The encoding system as claimed in claim 5, wherein $K_1=1$, $K_2=1/\sqrt{3}$ and $K_3$ is preferably equal to either 1 or zero.

7. The encoding system as claimed in claim 6, wherein said means for estimating power estimates the power $v_m$ in the signal block of subband signal $SB_m$ according to the following relationship:

$$v_m = \frac{1}{q} \sum_{j=1}^{q} s_j^2,$$

where $s_j$ is the amplitude of a jth sample in that signal block, j being an integer such that $1 \leq j \leq q$ and $s_j$ being a variable.

8. The encoding system as claimed in claim 5, wherein said means for estimating power estimates the power $v_m$ in the signal block of subband signal $SB_m$ according to the following relationship:

$$v_m = \frac{1}{q} \sum_{j=1}^{q} s_j^2,$$

where $s_j$ is the amplitude of a jth sample in that signal block, j being an integer such that $1 \leq j \leq q$ and $s_j$ being a variable.

9. The encoding system as claimed in claim 5, wherein said bit need determining means further comprises means for adding and multiplying logarithmically represented values.

10. The encoding system as claimed in claim 1, further comprising signal formatting means for assembling into a frame of an output digital signal having successive frames the q samples from the time-equivalent signal blocks of the subband signals which have been quantized by said quantizing means, scale factor information being included in the frame in the form of x-bit words representing the scale factors associated with the time-equivalent signal blocks for which the q samples are included in the frame.

11. A transmitter, comprising the encoding system of claim 1.

12. The transmitter as claimed in claim 11, further comprising signal formatting means for assembling into a frame of an output digital signal having successive frames the q samples from the time-equivalent signal blocks of the subband signals which have been quantized by said quantizing means, scale factor information being included in the frame in the form of x-bit words representing the scale factors associated with the time-equivalent signal blocks for which the q samples are included in the frame.

13. The transmitter as claimed in claim 12, further comprising a recording means for recording the output digital signal in a track on a record carrier.

14. The transmitter as claimed in claim 13, wherein the record carrier is a magnetic record carrier.

15. A method of encoding a digital signal having a specific sampling frequency and bandwidth, comprising:

dividing the bandwidth of the digital signal into M successive subbands, and generating, in response to the digital signal, M subband signals having reduced sampling frequencies, each of the subband signals being associated with one of the subbands;

quantizing time-equivalent signal blocks of the subband signals, a subband signal SBm of the subband signals having successive signal blocks which each contain q samples of that subband signal, each sample in a signal block of subband signal $SB_m$ having an amplitude and being quantized by $n_m$ bits, where $n_m$ may vary for different signal blocks of subband signal $SB_m$;

wherein in order to quantize the time-equivalent signal blocks, the following steps are performed:

determining bit needs for the time-equivalent signal blocks by:

(a) estimating power within the time-equivalent signal blocks, the signal block of subband signal $SB_m$ having a power $v_m$;

(b) determining scale factors for the time-equivalent signal blocks, a scale factor $SF_m$ for the signal block of subband signal $SB_m$ being determined from a sample therein which has a maximum absolute amplitude value;

(c) determining masking magnitudes for the time-equivalent signal blocks, the signal block of subband signal $SB_m$ having a masking magnitude $w_m$ which is determined in accordance with the following relationship:

$$w_m = \sum_{i=1}^{M} d_{mi} v_i + w_{r,m},$$

where $d_{mi}v_i$ denotes masked power in the signal block of subband signal $SB_m$ as a result of power $v_i$ in a time-equivalent signal block of a subband signal $SB_i$ of the subband signals, $d_{mi}$ denotes a matrix coefficient in an $M \times M$ matrix by which the power $v_i$ is multiplied to determine the masked power in the signal block of subband signal $SB_m$ as a result of the time-equivalent signal block of subband signal $SB_i$, and $w_{r,m}$ denotes a masking threshold in the signal block of subband signal $SB_m$; and (d) determining the following relationship for the time-equivalent signal blocks of the subband signals:

$$b_m = K_1 \cdot {}^2\log(K_2 \sqrt{SF_m^2/w_m} + K_3),$$

where $K_1$, $K_2$ and $K_3$ are constants; and $b_m$ is a bit need for the signal block of subband signal $SB_m$ corresponding to the number of bits by which the q samples in that signal block should be represented, and $b_m$ may vary for different signal blocks of subband signal $SB_m$; and allocating bits to the time-equivalent signal blocks from an available number of bits B, $n_m$ bits being allocated each of the q samples of the signal block of subband signal $SB_m$ in accordance with the bit need $b_m$ for that signal block;

wherein M, m and i are integers such that $1 \leq m \leq M$ and $1 \leq i \leq M$; q and B are integers, where q is greater than unit and B is greater than zero; and $b_m$, $n_m$, $v_m$, $v_i$, $SF_m$, $w_m$, $d_{mi}$ and $w_{r.m}$ are variables, where $n_m$ and $SF_m$ are greater than or equal to zero.

16. The method as claimed in claim 15, wherein in determining the masking magnitude $w_m$ a logarithmic representation is used for $d_{mi}$, $v_i$, $w_m$ and $w_{r.m}$.

17. The method as claimed in claim 15, wherein $K_1 = 1$, $K_2 = 1/\sqrt{3}$ and $K_3$ is preferably equal to either 1 or zero.

18. The method as claimed in claim 11, wherein the power $v_m$ in the signal block of subband signal $SB_m$ is estimated in accordance with following relationship:

$$v_m = \frac{1}{q} \sum_{j=1}^{q} s_j^2,$$

where $s_j$ is the amplitude of a jth sample in that signal block, j being an integer such that $1 \leq j \leq q$ and $s_j$ being a variable.

19. The method as claimed in claim 15, further comprising the step of assembling into a frame of an output digital signal having successive frame the q samples from the time-equivalent signal blocks of the subband signals which have been quantized, scale factor information being included in the frame in the form of x-bit words representing the scale factors associated with the time-equivalent signal blocks for which the q samples are included in the frame.

20. The method as claimed in claim 19, further comprising the recording the output digital signal in a track on a record carrier.

21. The method as claimed in claim 20, wherein the record carrier is a magnetic record carrier.

22. An encoding system for encoding a digital signal, comprising:

means for dividing the digital signal into a plurality of subband signals, each of the subband signals having a plurality of signal blocks, each containing q samples of that subband signal, where q is a positive integer, which are successive in time, each of the signal blocks of a subband signal being time-equivalent with a corresponding signal block of each of the other subband signals, corresponding signal blocks of the subband signals constituting time-equivalent signal blocks;

means for quantizing each of the q samples of each of the time-equivalent signal blocks with $n_m$ bits, where $n_m$ is a variable greater than or equal to zero which may vary for the time-equivalent signal blocks and/or different signal blocks within the same subband signal and m is a positive integer denoting which one of the subband signals a signal block comes from;

bit determining means for determining a bit need $b_m$ for each of the time-equivalent signal blocks, where $b_m$ is a variable which may vary for the time-equivalent signal blocks and/or different signal blocks within the same subband signal, the bit need $b_m$ for each of the time-equivalent signal blocks corresponding to the number of bits by which the q samples in that signal block should be represented and being determined on the basis of a scale factor for that signal block, a linear combination of each masked power in that signal block resulting from power in each of the time-equivalent signals blocks and a masking threshold for that signal block; and means for allocating, from an available number of bits B, where B is a positive integer, the $n_m$ bits to each of the q samples of each of the time-equivalent signal blocks in accordance with the bit need $b_m$ for each of the time-equivalent signal blocks.

23. The encoding system as claimed in claim 22, wherein said bit need determining means comprises:

estimation means for estimating the power within each of the time-equivalent signal blocks;

first determining means for determining the scale factor for each of the time-equivalent signal blocks;

second determining means for determining a masking magnitude for each of the time-equivalent signal blocks, the masking magnitude for a signal block being determined based on the masked power in the signal block as a result of the power in each of the time-equivalent signals blocks and the masking threshold for the signal block; and third determining means for determining the bit need $b_m$ for each of the time-equivalent signal blocks.

24. The encoding system as claimed in claim 23, wherein said estimation means estimates the power in a signal block in accordance with the following relationship:

$$v_m = \frac{1}{q} \sum_{j=1}^{q} s_j^2,$$

where $v_m$ is a variable denoting the power in a signal block and $s_j$ is variable denoting the amplitude of a jth sample in the signal block, j being an integer such that $1 \leq j \leq q$.

25. The encoding systems as claimed in claim 23, wherein said first determining means determines the scale factor for a signal block from a sample therein having a maximum absolute amplitude value.

26. The encoding systems as claimed in claim 23, wherein said second determining means determines the masking magnitude for a signal block in accordance with the following relationship:

$$w_m = \sum_{i=1}^{M} d_{mi} v_i + w_{r.m},$$

where $w_m$ is a variable denoting the masking magnitude for the signal block, M is a positive integer equal to the number of subband signals, each of which are denoted by i, which is a positive integer such that $1 \leq i \leq M$, $d_{mi}v_i$ is the masked power in the signal block as a result of power $v_i$, where $v_i$ is variable, in one of the time-equivalent signal blocks, which time-equivalent signal block is from subband signal i, $d_{mi}$ is variable denoting a matrix coefficient in an $M \times M$ matrix by which the power $v_i$ is multiplied to determine the masked power in the signal block as a result of the time-equivalent signal block from subband signal i, and $w_{r.m}$ is a variable denoting the masking threshold in the signal block.

27. The encoding system as claimed in claim 23, wherein said third determining means determines the bits need $b_m$ for a signal block in accordance with the following relationship:

$$b_m = K_1 \cdot {}^2\log(K_2 \sqrt{SF_m{}^2/w_m} + K_3),$$

where $K_1$, $K_2$ and $K_3$ are constants, $SF_m$ is a variable denoting the scale factor for the signal block and wm is a variable denoting the masking magnitude for the signal block.

28. The encoding system as claimed in claim 22, further comprising signal formatting means for assembling into a frame of an output digital signal having successive frames the q samples from the time-equivalent signal blocks which have been quantized, scale factor information being included in the frame in the form of x-bit words representing the scale factors associated with the time-equivalent signal blocks for which the q samples are included in the frame.

29. A transmitter, comprising the encoding system of claim 28.

30. The transmitter as claimed in claim 29, further comprising a recording means for recording the output signal in a track of a record carrier.

31. A transmitter, comprising the encoding system of claim 22.

32. The encoding systems as claimed in claim 22, wherein the subband signals have reduced sampling frequencies as compared to the digital signal.

33. A method for encoding a digital signal, comprising:
dividing the digital signal into a plurality of subband signals, each of the subband signals having a plurality of signal blocks, each containing q samples of that subband signal, where q is a positive integer, which are successive in time, each of the signal blocks of a subband signal being time-equivalent with a corresponding signal block of each of the other subband signals, corresponding signal blocks of the subband signals constituting time-equivalent signal blocks; and
quantizing each of the q samples of each of the time-equivalent signal blocks with $n_m$ bits, where $n_m$ is a variable greater than or equal to zero which may vary for the time-equivalent signal blocks and/or different signal blocks within the same subband signal and m is a positive integer denoting which one of the subband signals a signal block comes from;
wherein in order to quantize each of the time-equivalent signal blocks, the following additional steps are preformed:
determining a bit need $b_m$ for each of the time-equivalent signal blocks, where $b_m$ is a variable which may vary for the time-equivalent signal blocks and/or different signal blocks within the same subband signal, the bit need $b_m$ for each of the time-equivalent signal blocks corresponding to the number of bits by which the q samples in that signal block should be represented and being determined on the basis of a scale factor for that signal block, a linear combination of each masked power in that signal block resulting from power in each of the time-equivalent signals blocks and a masking threshold for that signal block; and
allocating, from an available number of bits B, where B is a positive integer, the $n_m$ bits to each of the q samples of each of the time-equivalent signal blocks in accordance with the bit need $b_m$ for each of the time-equivalent signal blocks.

34. The method as claimed in claim 33, wherein determining the bit need $b_m$ for each of the time-equivalent signal blocks includes:
estimating the power within each of the time-equivalent signal blocks;
determining the scale factor for each of the time-equivalent signal blocks; and
determining a masking magnitude for each of the time-equivalent signal blocks, the masking magnitude for a signal block being determined based on the masked power in the signal block as a result of the power in each of the time-equivalent signals blocks and the masking threshold for the signal block.

35. The method as claimed in claim 34, wherein the power in a signal block is estimated in accordance with the following relationship:

$$v_m = \frac{1}{q} \sum_{j=1}^{q} s_j^2,$$

where $v_m$ is a variable denoting the power in a signal block and $s_j$ is variable denoting the amplitude of a jth sample in the signal block, j being an integer such that $1 \leq j \leq q$.

36. The method as claimed in claim 34, wherein the scale factor for a signal block is determined from a sample therein having a maximum absolute amplitude value.

37. The method as claimed in claim 34, wherein the masking magnitude for a signal block is determined in accordance with the following relationship:

$$w_m = \sum_{i=1}^{M} d_{mi}v_i + w_{r.m},$$

where $w_m$ is a variable denoting the masking magnitude for the signal block, M is a positive integer equal to the number of subband signals, each of which are denoted by i, which is a positive integer such that $1 \leq i \leq M$, $d_{mi}v_i$ is the masked power in the signal block as a result of power $v_i$, where $v_i$ is variable, in one of the time-equivalent signal blocks, which time-equivalent signal block is from subband signal i, $d_{mi}$ is variable denoting a matrix coefficient in an $M \times M$ matrix by which the power $v_i$ is multiplied to determine the masked power in the signal block as a result of the time-equivalent signal block from subband signal i, and $w_{r.m}$ is a variable denoting the masking threshold in the signal block.

38. The method as claimed in claim 34, further comprising assembling into a frame of an output digital signal having successive frames the q samples from the time-equivalent signal blocks which have been quantized, scale factor information being included in the frame in the form of x-bit words representing the scale factors associated with the time-equivalent signal blocks for which the q samples are included in the frame.

39. The method as claimed in claim 33, wherein the bit need $b_m$ for a signal block is determined in accordance with the following relationship:

$$b_m = K_1 \cdot {}^2\log(K_2 \sqrt{SF_m^2/w_m} + K_3),$$

where $K_1$, $K_2$ and $K_3$ are constants, $SF_m$ is a variable denoting the scale factor for the signal block and wm is a variable denoting a masking magnitude for the signal block, the masking magnitude being a function of each masked power in the signal block resulting from power in each of the time-equivalent signals blocks and the masking threshold for the signal block.

40. A bit need determining device for determining bits needs for time-equivalent signal blocks of subband signals, the device comprising:
means for estimating power within each of the time-equivalent signal blocks;
means for determining a scale factor for each of the time-equivalent signal blocks;
means for determining a masking magnitude for each of the time-equivalent signal blocks, the masking magnitude for a time-equivalent signal block being determined based on a linear combination of each masked power in the time-equivalent signal block resulting from the power in each of the time-equivalent signals blocks and a masking threshold for the time-equivalent signal block; and
means for determining a bit need $b_m$ for each of the time equivalent signal blocks, the bit need $b_m$ for a time-equivalent signal block being determined based upon the scale factor and the masking magnitude for the time-equivalent signal block.

41. A bit need determining device for determining bit needs for time-equivalent signal blocks of M subband signals, each of the time-equivalent signal blocks having q samples, where q is a positive integer, the device comprising:
means for estimating power within the time-equivalent signal blocks, the power within a time-equivalent signal block being denoted $v_m$, where $v_m$ is a variable, and m is a positive integer, such that $1 \leq m \leq M$, denoting which one of subband signals the time-equivalent signal block comes from;
means for determining scale factors for the time-equivalent signal blocks, a scale factor $SF_m$, where $SF_m$ is a variable greater than or equal to zero, for a time-equivalent signal block being determined from a sample therein having a maximum absolute amplitude value;
means for determining masking magnitudes for the time-equivalent signal blocks, a time-equivalent signal block having a masking magnitude $w_m$, where $w_m$ is a variable, which is determined in accordance with the following relationship:

$$w_m = \sum_{i=1}^{M} d_{mi}v_i + w_{r.m},$$

where i is a positive integer, such that $1 \leq i \leq M$, denoting one of the subband signals, $d_{mi}v_i$ denotes masked power in the time-equivalent signal block as a result of power $v_i$, where $v_i$ is variable, in one of the time-equivalent signal blocks, which is from subband signal i, $d_{mi}$ is variable denoting a matrix coefficient in an $M \times M$ matrix by which the power $v_i$ is multiplied to determine the masked power in the time-equivalent signal block as a result of the one of the time-equivalent signal blocks from subband signal i, and $w_{r.m}$ is a variable denoting the masking threshold in the signal block; and
means for determining the bit need $b_m$ for the time-equivalent signal block, the bit need bm for a time-equivalent signal block being determined in accordance with the following relationship:

$$b_m = K_1 \cdot {}^2\log(K_2 \sqrt{SF_m^2/w_m} + K_3),$$

where $K_1$, $K_2$ and $K_3$ are constants.

42. The bit need determining device as claimed in claim 41, wherein $K_1=1$, $K_2=1/\sqrt{3}$ and $K_3$ is preferably equal to either 1 or zero.

43. The bit need determining device as claimed in claim 41, wherein said means for estimating power estimates the power $v_m$ in the time-equivalent signal block according to the following relationship:

$$v_m = \frac{1}{q} \sum_{j=1}^{q} s_j^2,$$

where $S_j$ is variable denoting the amplitude of a jth sample in the time-equivalent signal block, j being an integer such that $1 \leq j \leq q$.

44. The bit need determining device as claimed in claim 41, wherein said bit need determining means utilizes a logarithmic representation for the values of $d_{mi}$, $v_i$, $w_m$ and $w_{r.m}$ when determining the masking magnitude for the time-equivalent signal block.

45. The bit need determining device as claimed in claim 44, further comprising means for adding and multiplying the logarithmically represented values.

46. A transmitter, comprising the bit need determining device claimed in claim 41.

47. A method for determining bits needs for time-equivalent signal blocks of subband signals, the device comprising:
estimating power within each of the time-equivalent signal blocks;
determining a scale factor for each of the time-equivalent signal blocks;
determining a masking magnitude for each of the time-equivalent signal blocks, the masking magnitude for a time-equivalent signal block being determined based on each masked power in the time-equivalent signal block resulting from the power in each of the time-equivalent signals blocks and a masking threshold for the time-equivalent signal block; and
determining a bit need $b_m$ for each of the time equivalent signal blocks, the bit need $b_m$ for a time-equivalent signal block being determined based upon the scale factor and the masking magnitude for the time-equivalent signal block.

48. A method for determining bit needs for time-equivalent signal blocks of M subband signals, each of the time-equivalent signal blocks having q samples, where q is a positive integer, the device comprising:
estimating power within the time-equivalent signal blocks, the power within a time-equivalent signal block being denoted $v_m$, where $v_m$ is a variable, and m is a positive integer, such that $1 \leq m \leq M$, denoting which one of subband signals the time-equivalent signal block comes from;

determining scale factors for the time-equivalent signal blocks, a scale factor $SF_m$, where $SF_m$ is a variable greater than or equal to zero, for a time-equivalent signal block being determined from a sample therein having a maximum absolute amplitude value;

determining masking magnitudes for the time-equivalent signal blocks, a time-equivalent signal block having a masking magnitude $w_m$, where $w_m$ is a variable, which is determined in accordance with the following relationship:

$$w_m = \sum_{i=1}^{M} d_{mi} v_i + w_{r.m},$$

where i is a positive integer, such that $1 \leq i \leq M$, denoting one of the subband signals, $d_{mi} v_i$ denotes masked power in the time-equivalent signal block as a result of power $v_i$, where $v_i$ is variable, in one of the time-equivalent signal blocks, which is from subband signal i, $d_{mi}$ is a variable denoting a matrix coefficient in an $M \times M$ matrix by which the power $v_i$ is multiplied to determine the masked power in the time-equivalent signal block as a result of the one of the time-equivalent signal blocks from subband signal i, and $w_{r.m}$ is a variable denoting the masking threshold in the signal block; and determining the bit need $b_m$ for the time-equivalent signal block, the bit need bm for a time-equivalent signal block being determined in accordance with the following relationship:

$$b_m = K_1 \cdot {}^2\log(K_2 \sqrt{SF_m^2/w_m} + K_3),$$

where $K_1$, $K_2$ and $K_3$ are constants.

49. The method as claimed in claim 48, wherein $K_1 = 1$, $K_2 = 1/\sqrt{3}$ and $K_3$ is preferably equal to either 1 or zero.

50. The method as claimed in claim 48, wherein the power $v_m$ in the time-equivalent signal block is estimated according to the following relationship:

$$v_m = \frac{1}{q} \sum_{j=1}^{q} s_j^2,$$

where $s_j$ is variable denoting the amplitude of a jth sample in the time-equivalent signal block, j being an integer such that $1 \leq j \leq q$.

51. The method as claimed in claim 48, wherein a logarithmic representation for the values of $d_{mi}$, $v_i$, $w_m$ and $w_{r.m}$ are utilized in determining the masking magnitude for the time-equivalent signal block.

* * * * *

UNITED STATES PATENT AND TRADEMARK OFFICE
CERTIFICATE OF CORRECTION

PATENT NO. : 5,365,553
DATED : November 15, 1994
INVENTOR(S) : Raymond N.J., et. al.

It is certified that error appears in the above-indentified patent and that said Letters Patent is hereby corrected as shown below:

```
Column  4,   line 46,  delete "each of";
             line 52,  after "which" insert --each of--;
Column 19,   Claim 18, line 30, change "11" to --15--;
             Claim 20, line 2,  delete "the";
Column 20,   Claim 24, line 50, after "is" insert --a--;
Column 21,   Claim 26, line 3,  after "is" insert --a--;
                       line 5,  after "is" insert --a--;
             Claim 27, line 20, change "wm" to --$w_m$--;
Column 22,   Claim 35, line 38, after "is" insert --a--;
             Claim 37, line 58, after "is" insert --a--;
                       line 60, after "is" insert --a--;
Column 23,   Claim 39, line 14, change "wm" to --$w_m$--;
             Claim 40, line 33, change "signals" to --signal--;
```

UNITED STATES PATENT AND TRADEMARK OFFICE
CERTIFICATE OF CORRECTION

PATENT NO. : 5,365,553
DATED : November 15, 1994
INVENTOR(S) : Raymond N.J., et. al.

It is certified that error appears in the above-indentified patent and that said Letters Patent is hereby corrected as shown below:

```
Column 24, Claim 41, line 1,   after "is" insert --a--;
                     line 2,   after "is" insert --a--;
                     line 10,  change "bm" to --b_m--;
           Claim 43, line 29,  after "is" insert --a--;
           Claim 47, line 55,  change "signals" to --signal--;
Column 25, Claim 48, line 24,  after "is" insert --a--;
                     line 25,  after "is" insert --a--;
Column 26, Claim 48, line 4,   change "bm" to --b_m--;
           Claim 50, line 23,  after "is" insert --a--.
```

Signed and Sealed this

Fourth Day of February, 1997

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,365,553

DATED : November 15, 1994

INVENTOR(S) : RAYMOND N.J. VELDHUIS; ROBERT G. VAN DER WAAL; LEON M. VAN DE KERKHOF; and GERRIT J. KEESMAN It is certified that error appears in the above-indentified patent and that said Letters Patent is hereby corrected as shown below:

On title page, between "[63]" and "[51]" insert

--[30] Foreign Application Priority Data

May 14, 1990 [NL] Netherlands    9001128--.

Signed and Sealed this

Seventeenth Day of June, 1997

BRUCE LEHMAN

Attest:

Attesting Officer    Commissioner of Patents and Trademarks